United States Patent [19]

Yoshida et al.

[11] Patent Number: 5,475,291

[45] Date of Patent: Dec. 12, 1995

[54] ADJUSTMENT DEVICE FOR ADJUSTING CONTROL PARAMETERS OF A SERVO MOTOR AND AN ADJUSTMENT METHOD THEREFOR

[75] Inventors: Shuichi Yoshida, Osaka; Yukihiro Dojo; Shigeru Matsukawa, both of Hirakata, all of Japan

[73] Assignee: Matsushita Electric Industrial Co., Ltd., Kadoma, Japan

[21] Appl. No.: 164,422

[22] Filed: Dec. 9, 1993

[30] Foreign Application Priority Data

Dec. 10, 1992 [JP] Japan ................................. 4-330173
Mar. 12, 1993 [JP] Japan ................................. 5-051893

[51] Int. Cl.⁶ ............................................. G05B 19/405
[52] U.S. Cl. .................... 318/568.22; 318/610; 318/560; 318/632
[58] Field of Search .......................... 318/568.22, 610, 318/560, 632

[56] References Cited

U.S. PATENT DOCUMENTS

| | | | |
|---|---|---|---|
| 3,652,942 | 3/1972 | O'Connor et al. | 328/127 |
| 4,096,562 | 6/1978 | Linz | 318/632 |
| 4,983,898 | 1/1991 | Kanda | 318/561 |
| 5,065,263 | 11/1991 | Yoshida et al. | 360/77.03 |
| 5,157,597 | 10/1992 | Iwashita | 364/157 |
| 5,180,956 | 1/1993 | Oaki et al. | 318/568.22 |
| 5,304,905 | 4/1994 | Iwasaki | 318/568.22 |
| 5,311,110 | 5/1994 | Iwashita | 318/568.22 |

FOREIGN PATENT DOCUMENTS

| | | |
|---|---|---|
| 3122701 | 5/1991 | Japan. |
| 4100130 | 4/1992 | Japan. |
| 4302306 | 10/1992 | Japan. |

*Primary Examiner*—William M. Shoop, Jr.
*Assistant Examiner*—Karen Masih
*Attorney, Agent, or Firm*—Renner, Otto, Boisselle & Sklar

[57] ABSTRACT

An adjustment device for adjusting a plurality of control parameters used for controlling a servo motor according to the present invention includes: a first correction unit for correcting at least one of the plurality of control parameters; a calculation unit for calculating a change rate, due to the correction, of the at least one control parameter corrected by the first correction unit; and a second correction unit for correcting, based on the calculated change rate, the control parameters except the at least one control parameter corrected by the first correction unit, the adjustment device constituting a control system for the servo motor along with the servo motor.

34 Claims, 18 Drawing Sheets

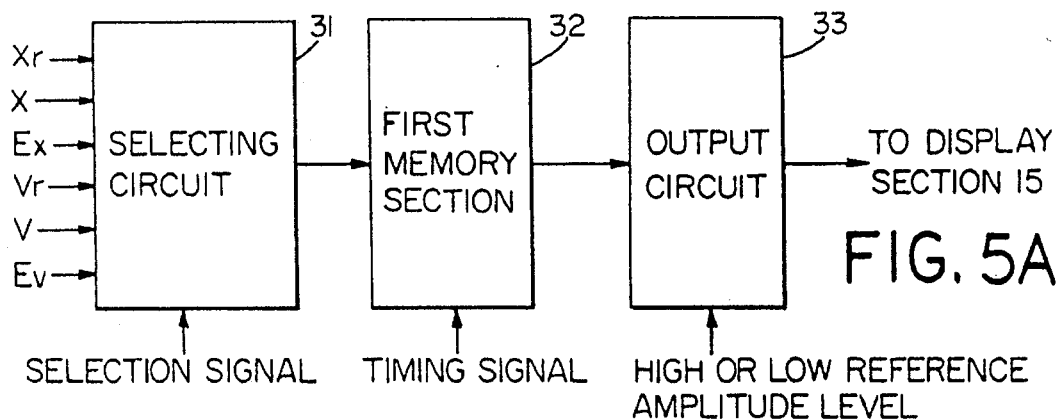
FIG. 5A
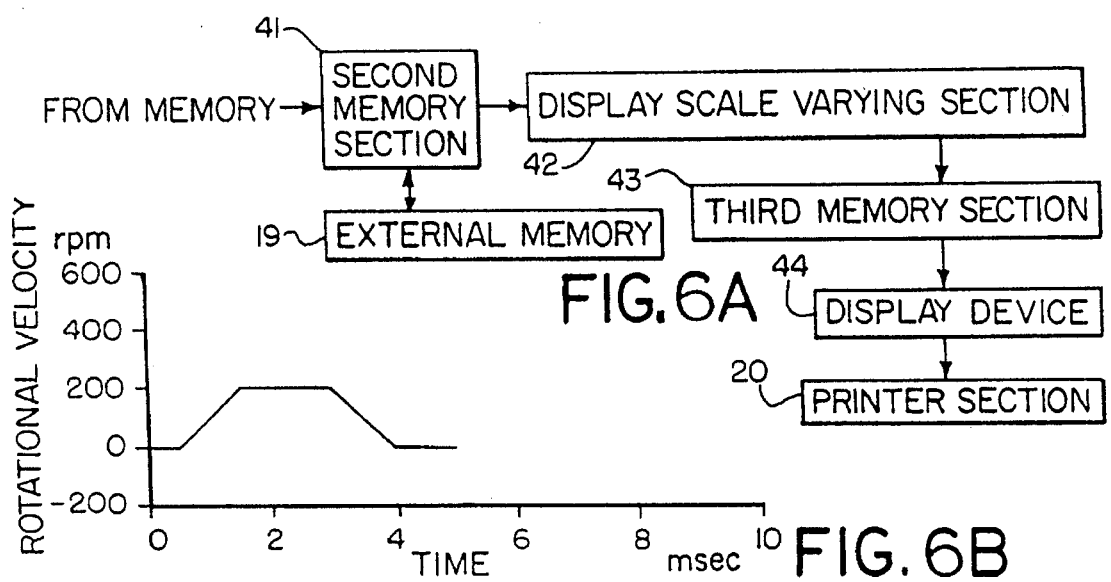
FIG. 6A
FIG. 6B
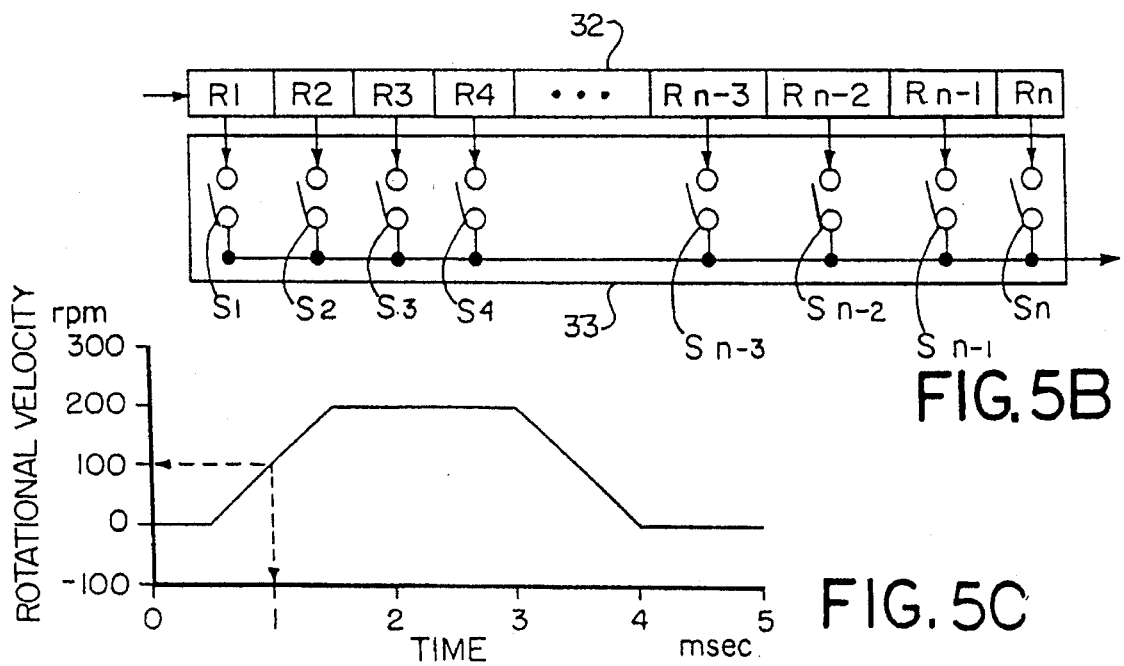
FIG. 5B
FIG. 5C

ADJUSTMENT DEVICE FOR ADJUSTING CONTROL PARAMETERS OF A SERVO MOTOR AND AN ADJUSTMENT METHOD THEREFOR

BACKGROUND OF THE INVENTION

1. Field of the Invention

The present invention relates to an adjustment device and method for adjusting control parameters of a controller for a servo motor used in a milling machine, robot, printer, etc.

2. Description of the Related Art

In general, a control system for a servo motor includes at least one of: a closed-loop position control system in which a driving instruction is sent to the servo motor such that an error amount between a rotational position instruction from a controller and rotational position information from the servo motor becomes minimum; and a closed-loop velocity control system in which a driving instruction is sent to the servo motor such that an error amount between a rotational velocity instruction from the controller and rotational velocity information obtained by differentiating the above-mentioned rotational position information becomes minimum.

FIG. 21 is a block diagram showing a control system for a conventional servo motor. As is shown in FIG. 21, the control system consists primarily of a velocity loop for feeding back rotational velocity information of the servo motor and a position loop for feeding back rotational position information of the servo motor. An integrator 6 for removing a velocity servo offset is inserted in the velocity loop. Actual model 109 represents the servo motor and a load provided coaxially with the servo motor. Herein, JM represents inertia of a rotator of the servo motor, while JL represents inertia of the load. The rotational position of the servo motor is detected by a rotary encoder (not shown) which is an angle measuring sensor. The detected rotational position is fed back to the position loop. The amount of position feedback is determined by a position proportional gain $K_p$ provided in the position loop. The position proportional gain $K_p$ is adjusted so that an error amount $E_x$ between a rotational position instruction $X_r$ and a rotational position signal X representing the actual rotational position of the servo motor becomes sufficiently small while maintaining the stability of the position loop. The rotational position signal X, which is detected by the rotary encoder, is converted into a rotational velocity signal V by a differentiator 7, and is fed back to the velocity loop. The amount of velocity feedback is determined by a velocity proportional gain $K_{vp}$ provided in the velocity loop. The velocity proportional gain $K_{vp}$ is adjusted, in accordance with an output from the position proportional gain $K_p$, so that an error amount $E_v$ between a rotational velocity instruction $V_r$ and the rotational velocity signal V becomes minimum without allowing the load to vibrate. The gain of the integrator 6 in the velocity loop is determined based on a velocity integral gain $K_{vi}$. The velocity integral gain $K_{vi}$ is adjusted so that an offset between the rotational velocity instruction $X_r$ and the rotational velocity signal X of the servo motor becomes minimum without allowing vibration to occur.

FIG. 22 is a block diagram showing a conventional adjustment device for adjusting control parameters of a servo motor. As is shown in FIG. 22, the adjustment device includes an instruction generator 1, a position proportional gain adjuster 3, a velocity proportional gain adjuster 4, a velocity integral gain adjuster 5, an integrator 6, a differentiator 7, a D/A (Digital/Analog) convertor 8, a driving circuit 9, a servo motor 10, a load 11 for the servo motor, a rotary encoder 12 provided coaxially with the servo motor, and a numerical value inputting section 13. The instruction generator 1 can be realized using an NC (Numerical Control) device. The portion enclosed by a dotted line is to be processed by means of a micro computer (not shown).

An operation of the adjustment device having the above configuration will now be described.

A rotational position instruction $X_r$ for the servo motor 10 is sent from the instruction generator 1 to the micro computer. The micro computer also receives a rotational position signal X output from the rotary encoder 12 so as to derive a rotational position error amount $E_x$ as a difference between the rotational position signal X and the rotational position instruction $X_r$. The rotational position signal X represents a rotational position of the servo motor 10. Next, the position proportional gain adjuster 3 multiplies the rotational position error amount $E_x$ by a position proportional gain so as to produce a rotational velocity instruction $V_r$. The rotational velocity instruction $V_r$ is applied to the velocity loop. A difference is derived between the rotational velocity instruction $V_r$ and a rotational velocity signal V obtained by differentiating the rotational position signal X at the differentiator 7, so as to produce a rotational velocity error amount signal $E_v$. The rotational velocity error amount signal $E_v$ is subjected to a proportional compensation and an integral compensation. Herein, a proportional compensation (conducted by the velocity proportional gain adjuster 4) refers to multiplication of the rotational velocity error amount signal $E_v$ by a velocity proportional gain; an integral compensation refers to multiplication of the rotational velocity error amount signal $E_v$ by a velocity integral gain (conducted by the velocity integral gain adjuster 5) and integration of the resultant product (conducted by the integrator 6). The result of the proportional compensation and the result of the integral compensation are added as shown. The resultant sum is transferred to the D/A convertor 8. An output from the D/A convertor 8 is converted into a triple-phase current instruction in the driving circuit 9. The triple-phase current instruction drives the servo motor 10 so as to move the load 11 to a desired rotational position.

Setting of the position proportional gain, the velocity proportional gain, and the velocity integral gain (hereinafter, these and other gain values may be referred generally to as 'control gains' for conciseness) is conducted by inputting these control gains by means of the numerical value inputting section 13 proportional gain adjuster 3, the velocity proportional gain adjuster 4, end the velocity integral gain adjuster 5. Each of the gain adjusters 3 to 5 multiplies an input control signal by the transferred control gain, as is described above.

Next, a conventional adjustment method for adjusting control parameters of a servo motor will be described in detail.

FIG. 23 is a Bode diagram showing frequency characteristics of an open-loop transfer function with respect to velocity of a control system of a servo motor. In FIG. 23, graph (1) shows a gain characteristic curve, while graph (2) shows a phase characteristic curve. In graph (1), an intersection of curve $a_1$ (indicated by the solid line) and an axis on which the feedback gain is 0 dB is commonly referred to as a gain crossover. The frequency at the gain crossover is defined as $f_O$. In graph (2), the difference between a phase angle of curve $b_1$ at the frequency $f_O$ and $-180°$ is commonly referred to as a phase margin. The phase margin is used as an amount for evaluation of the stability of the control system.

The velocity proportional gain $K_{vp}$ is a value of a proportional term of the velocity loop. The velocity proportional gain $K_{vp}$ determines the gain crossover frequency and the feedback gain of the velocity loop. By adjusting the velocity proportional gain $K_{vp}$, it becomes possible to sufficiently increase the feedback gain, even in cases where the load 11 has a high-mode mechanical resonance, without allowing the control system to oscillate due to a mechanical resonance component being fed back thereto, while keeping the feedback gain within a range where the control system remains stable. Characteristics of the mechanical resonance are shown in FIG. 23. Resonance occurs within the control system in cases where a peak of the feedback at a mechanical resonance frequency exceeds 0 dB. The velocity integral gain $K_{vi}$, by which the rotational velocity error amount signal $E_v$ is multiplied at the velocity integral gain adjuster 5, is a value of an integral term of the velocity loop. The velocity integral gain $K_{vi}$ serves to remove an offset of the velocity loop. The offset decreases as the velocity integral gain $K_{vi}$ increases; however, as the velocity integral gain $K_{vi}$ increases, the phase margin at the gain crossover decreases, thus making the control system unstable. The velocity integral gain $K_{vi}$, as well as the velocity proportional gain $K_{vp}$, is adjusted so that the phase margin at the gain crossover becomes sufficiently large and the feedback gain in a low frequency band becomes sufficiently large but not large enough to allow the control system to become unstable. The position proportional gain $K_p$, as well as the velocity integral gain $K_{vi}$, is adjusted so that the feedback gain is sufficiently large but not large enough to allow the control system to become unstable.

In general, the magnitude of the feedback gain and the stability of the control system can be comprehended by observing, in the case of positioning control, a rotational position instruction and a rotational position signal; and in the case of rotation control, a rotational velocity instruction and a rotational velocity signal. A measurement apparatus such as an oscilloscope can be used. Hereinafter, a conventional adjustment method for adjusting control parameters of a servo motor will be described with reference to FIG. 22.

First, adjustment during the positioning control is described. Initially, the velocity proportional gain $K_{vp}$, the velocity integral gain $K_{vi}$, and the position proportional gain $K_p$ are set at sufficiently small values. A rotational position instruction $X_r$ is input to the servo motor 10. The velocity proportional gain $K_{vp}$ is gradually increased while the rotational position signal X is observed by an oscilloscope. As soon as the rotational position signal X starts vibrating at a frequency substantially equal to the mechanical resonance frequency, the velocity proportional gain $K_{vp}$ is slightly decreased. This is because it is presumable that a mechanical resonance component is fed back to the control system. The adjustment of the velocity proportional gain $K_{vp}$ is completed when the vibration of the rotational position signal X is eliminated.

Next, the velocity integral gain $K_{vi}$ is gradually increased while the rotational position signal X is observed by an oscilloscope (not shown). As soon as the rotational position signal X starts vibrating at a frequency substantially equal to the gain crossover frequency, the velocity integral presumable that the phase margin at the gain crossover is inadequate. The adjustment of the velocity integral gain $K_{vp}$ is completed when the vibration of the rotational position signal X is eliminated. Last of all, the position proportional gain $K_p$ is adjusted. If the feedback gain is inadequate, the position proportional gain $K_p$ is gradually increased so that the error amount $E_x$ decreases. However, the phase margin at the gain crossover decreases as the position proportional gain $K_p$ increases, as in the case of adjustment of the velocity integral gain $K_{pv}$. Accordingly, the position proportional gain $K_p$ is adjusted so that the error amount $E_x$ becomes minimum without allowing the rotational position signal X to start vibrating.

Next, adjustment during the rotation control is described. Initially, as in the case of the positioning control, the velocity proportional gain $K_{vp}$, the velocity integral gain $K_{vi}$, and the position proportional gain $K_p$ are set at sufficiently small values. In a control system as shown in FIG. 22, the instruction generator 1 outputs a rotational position instruction $X_r$ to the servo motor 10. Simultaneously, the rotational velocity signal V and the rotational velocity instruction $V_r$ are observed by means of an oscilloscope. During the rotation control, vibration due to mechanical resonance and/or reduction in the phase margin may occur after a point where the servo motor 10 switches from an acceleration operation to a constantspeed operation, and after a point where the servo motor 10 switches from a deceleration operation to a zero-speed operation (i.e. a halt). The magnitude of the feedback gain can be inferred from the error amount $E_v$ between the rotational velocity instruction $V_r$ and the rotational velocity signal V during acceleration or deceleration of the servo motor 10. Based on these characteristics, the respective control gains can be adjusted by moving the servo motor 10 several times, through a similar method to that used for the positioning control.

However, such a conventional adjustment device suffers from the drawback that it is necessary to adjust the all the control gains, i.e. the velocity proportional gain, velocity integral gain, and position proportional gain. More specifically, a measurement apparatus such as an oscilloscope is required for observation of the rotational velocity signal, the rotational position signal, and the like. The observation is conducted while rotation instructions are given to the servo motor. The rotation state of the servo motor being monitored accordingly, the three control gains must repeatedly be adjusted while maintaining a fine balance thereamong, since they interact with one another. Moreover, the adjustment of the control gains is disadvantageous in that only skilled or experienced adjustment engineers can perform the adjustment sufficiently.

Moreover, such a conventional adjustment method for adjusting the control parameters is troublesome in that, when the control gains are varied, every control gain must be input by means of the numerical value inputting section. In cases where it is unknown in which ranges of control gains the control system remains stable, inputting a value which is substantially outside such ranges to any of the gain adjusters can cause a sudden change in the rotation of the servo motor. As a result, an excess oscillation may be generated, possibly destroying the servo motor. Moreover, in a conventional adjustment method, it is necessary to repeat many times the process of inputting a value for each control gain, where the value can only be adjusted by being increased or decreased by a small value.

In cases where, after the adjustment for the control gains of the servo motor has been completed, the load for the servo motor and/or the friction during rotation of the servo motor have drastically changed due to temporal deterioration or a change in circumstances, it becomes necessary to readjust the control gains. However, with a conventional adjustment device, it is not possible to store data such as the waveform of a control signal for the servo motor and values of the control gains during or after the adjustment of the control gains. Therefore, the adjustment data of a current adjustment is not available when a readjustment must be conducted, thus making it impossible to compare the current adjustment data and the subsequent readjustment data. This fact hinders the adjustment and readjustment processes of the control gains.

Although the adjustment data can be preserved by taking a photograph of the CRT display of the measurement apparatus such as an oscilloscope, or by using an apparatus having such a recording function, preparation and set up of such measurement apparatuses requires time, thus making the adjustment inconvenient. Moreover, the measurement apparatuses are again required at the time of the readjustment, increasing the time required therefore.

Moreover, even in cases where the load for the servo motor and/or the friction during rotation of the servo motor of a conventional adjustment device slightly vary due to temporal deterioration or change in circumstances, it is necessary to stop the operation of the machinery to which the servo motor is connected in order to readjust the control gains of the servo motor.

Moreover, when the load temporarily becomes excessive so that the stability of the control loop is lowered or the control loop goes out of control, a conventional adjustment device is not capable of automatically detecting such situations and readjusting the control parameters so as to render the control loop stable.

Moreover, even when the control loop manages stability, the desired response cannot be attained if it is impossible to set the loop gain at a high value. Therefore, there is a strong need in the art for an adjustment device and method which overcomes the following problems associated with conventional adjustment devices: how to restrain the aforementioned mechanical vibration; how to detect, in adjustment of the control parameters, the magnitude and the frequency of the resonance without using a special measurement apparatus; how to best utilize limited hardware and software resources for the adjustment device; how to conduct efficiently the adjustment of the control parameters in view of possible resonance(s).

SUMMARY OF THE INVENTION

An adjustment device for adjusting a plurality of control parameters used for controlling a servo motor according to the present invention includes: a first correction section for correcting at least one of the plurality of control parameters; a calculation section for calculating a change rate, due to the correction, of the at least one control parameter corrected by the first correction section; and a second correction section for correcting, based on the calculated change rate, the control parameters except the at least one control parameter corrected by the first correction section, the adjustment device constituting a control system for the servo motor along with the servo motor.

In one embodiment of the invention, the first correction section adjusts the at least one control parameter so that a phase margin of the control system for the servo motor falls within a predetermined range.

In another embodiment of the invention, the second correction section adjusts the control parameters except the at least one control parameter corrected by the first correction section so that a phase margin of the control system for the servo motor falls within a predetermined range.

In still another embodiment of the invention, the calculation section calculates the change rate based on the at least one control parameter and a corrected value of the at least one control parameter.

In still another embodiment of the invention, the at least one control parameter includes at least one of: a velocity proportional parameter for increasing a response speed of the servo motor; and a velocity integral parameter for reducing a velocity offset of a velocity servo system included in the control system for the servo motor, the velocity servo system approximating a rotational velocity of the servo motor to a predetermined rotational velocity.

In still another embodiment of the invention, the at least one control parameter includes a position proportional parameter for approximating a rotational position of the servo motor to a predetermined rotational position, the control system for the servo motor including a position servo system for approximating the rotational position of the servo motor to the predetermined rotational position.

In still another embodiment of the invention, the at least one control parameter includes at least one of: a velocity proportional parameter for increasing a response speed of the servo motor; a velocity integral parameter for reducing a velocity offset of a velocity servo system for approximating a rotational velocity of the servo motor to a predetermined rotational velocity; and a position proportional parameter for approximating a rotational position of the servo motor to a predetermined rotational position, the control system for the servo motor including the velocity servo system and a position servo system for approximating the rotational position of the servo motor to the predetermined rotational position.

In still another embodiment of the invention, the at least one control parameter is the velocity proportional parameter, and wherein the control parameters except the at least one control parameter corrected by the first correction section are the velocity integral parameter and/or the position proportional parameter, the second correction section including section for multiplying the velocity integral parameter by the square of the change rate of the velocity proportional parameter and section for multiplying the position proportional parameter by the change rate of the velocity proportional parameter.

In still another embodiment of the invention, the adjustment device further includes key inputting section for increasing and decreasing the at least one control parameter by a predetermined magnification rate, and magnification rate varying section for varying the predetermined magnification rate.

In still another embodiment of the invention, the adjustment device further includes: an instruction generating section for generating a rotation instruction for the servo motor; a detection section for detecting rotation information of the servo motor and for generating a rotation information signal representing the detected rotation information; an error amount calculating section for calculating an error amount between the rotation information signal and the rotation instruction; and a display section for displaying at least one of the rotation information signal, the rotation instruction, and the error amount output from the memory section in time sequence.

In still another embodiment of the invention, the adjustment device further includes: an instruction generating section for generating a rotation instruction for the servo motor; a detection section for detecting rotation information of the servo motor and for generating a rotation information signal representing the detected rotation information; an error amount calculating section for calculating an error amount between the rotation information signal and the rotation instruction; a memory section for storing at least one of the rotation information signal, the rotation instruction, and the error amount: and a display section for displaying at least one of the rotation information signal, the rotation instruction, and the error amount output from the memory section in time sequence; an external memory section for storing, in time sequence, at least one of the rotation information signal, the rotation instruction, and the error amount output from the memory section; and a printer section for printing at least a portion of an image displayed by the display section.

In still another embodiment of the invention, the display section includes: a selection section for selecting at least one of the rotation information signal, the rotation instruction, and the error amount; a first memory section for storing a first signal generated by, based on the selected one of the rotation information signal, the rotation instruction, and the error amount in time sequence, the selection section; an output section for receiving a second signal generated by, based on a predetermined reference amplitude level, the first memory section; a second memory section for storing a third signal generated by the output section in time sequence and for generating a fourth signal; a display scale setting section for setting a display scale at which the third signal is displayed by the display section and a data storage section for storing the predetermined reference amplitude level, a display range of the fourth signal in an amplitude direction, a display range of the fourth signal in a direction of a time axis, and the display scale.

In still another embodiment of the invention, the adjustment device further includes a velocity proportional parameter adjusting section for increasing the response speed of the servo motor; a velocity integral parameter adjusting section for reducing the velocity offset of the velocity servo system; a position proportional parameter adjusting section for approximating the rotational position of the servo motor to the predetermined rotational position; and a differentiation section for generating a differential signal by differentiating the rotation information signal detected by the detection section.

In still another embodiment of the invention, the adjustment device further includes a control characteristics analysis section for calculating gain characteristics and phase characteristics based on the position proportional signal and the differential signal, the gain characteristics representing a relationship between gain values and frequencies and the phase characteristics representing a relationship between phases and frequencies.

In still another embodiment of the invention, the adjustment device further includes: a resonance restraining section for restraining gain corresponding to a certain frequency; and a sampling frequency switching section for inputting a signal representing the certain frequency to the resonance restraining section.

In still another embodiment of the invention, a signal representing the certain frequency is input to the resonance restraining section by the key inputting section.

In still another embodiment of the invention, the adjustment device further includes a resonance detecting section for generating a signal representing the certain frequency based on the rotation information generated by the detection section and a signal input to the servo motor.

In still another embodiment of the invention, the detection section includes: a mathematical formula model section in which a mathematical formula representing the servo motor, to which a load is applied, is generated, the mathematical formula model section generating, based on the signal input to the servo motor, a model signal in which a resonance signal is removed from the rotation information signal; an error amount detecting section for calculating an error amount between the model signal and the rotation information signal generated by the detection section; and a sampling frequency selecting section for generating the signal representing the certain frequency based on the error amount detected by the error amount detecting section, the signal being such that the error amount becomes minimum.

In still another embodiment of the invention, the adjustment device further includes a resonance analysis section for generating a resonance signal of the servo motor based on the rotation information generated by the detection section and resonance sound synthesizing section for generating a resonance sound based on the resonance signal.

In still another embodiment of the invention, the resonance sound synthesizing section includes frequency conversion section for converting a frequency of the resonance signal generated by the resonance analysis section into an audible frequency and amplifying section for amplifying an amplitude of the resonance signal.

In still another embodiment of the invention, the resonance restraining section includes a digital filter, the resonance restraining section modifying the digital filter in accordance with a certain rate by which the gain is restrained and the certain frequency, and wherein the sampling frequency switching section inputs a signal representing the certain frequency to the digital filter.

According to another aspect of the present invention, a method for adjusting a plurality of control parameters used for controlling a servo motor, includes: a first step for correcting at least one of the plurality of control parameters; a second step for calculating a change rate, due to the correction, of the at least one control parameter corrected in the first step; and a third step for correcting, based on the calculated change rate, the control parameters except the at least one control parameter corrected in the first step.

In one embodiment of the invention, the first step is a step for adjusting the at least one control parameter so that a phase margin of a control system for the servo motor falls within a predetermined range.

In another embodiment of the invention, the third step is a step for adjusting the control parameters except the at least one control parameter corrected in the first step so that a phase margin of the control system for the servo motor falls within a predetermined range.

In still another embodiment of the invention, the second step is a step for calculating the change rate based on the at least one control parameter and a corrected value of the at least one control parameter.

In still another embodiment of the invention, the at least one control parameter includes at least one of: a velocity proportional parameter for increasing a response speed of the servo motor; and a velocity integral parameter for reducing a velocity offset of a velocity servo system included in the control system for the servo motor, the velocity servo system approximating a rotational velocity of the servo motor to a predetermined rotational velocity.

In still another embodiment of the invention, the at least one control parameter includes a position proportional parameter for approximating a rotational position of the servo motor to a predetermined rotational position, the control system for the servo motor including a position servo system for approximating the rotational position of the servo motor to the predetermined rotational position.

In still another embodiment of the invention, the at least one control parameter includes at least one of: a velocity proportional parameter for increasing a response speed of the servo motor; a velocity integral parameter for reducing a velocity offset of a velocity servo system for approximating a rotational velocity of the servo motor to a predetermined rotational velocity; and a position proportional parameter for approximating a rotational position of the servo motor to a predetermined rotational position, the control system for the servo motor including the velocity servo system and a position servo system for approximating the rotational position of the servo motor to the predetermined rotational position.

In still another embodiment of the invention, the at least one control parameter is the velocity proportional parameter, and wherein the control parameters except the at least one control parameter corrected by the first correction section are the velocity integral parameter and/or the position proportional parameter, the third step including a step for multiplying the velocity integral parameter by the square of the change rate of the velocity proportional parameter and a step for multiplying the position proportional parameter by the change rate of the velocity proportional parameter.

In still another embodiment of the invention, the method further includes a step for inferring inertia of the servo motor to which a load is applied, based on a rotation instruction signal for commanding acceleration and deceleration of the servo motor and torque of the servo motor when receiving the rotation instruction signal.

In still another embodiment of the invention, the first step includes a step for correcting by renewing the velocity proportional parameter, and wherein the second step includes a step for calculating the change rate of the velocity proportional parameter, and wherein the third step including a step for multiplying the velocity integral parameter by the square of the change rate of the velocity proportional parameter and a step for multiplying the position proportional parameter by the change rate of the velocity proportional parameter, the method further includes: a fourth step for inferring inertia of the servo motor to which a load is applied; a fifth step for setting an initial value for each of the velocity proportional parameter, the velocity integral parameter, and the position proportional parameter; a sixth step for designating a rate at which the velocity proportional parameter is alterable to be the same as or more than a first value; a seventh step for supplying the servo motor with an instruction for increasing a rotational velocity of the servo motor to, at a constant acceleration, a predetermined rotational velocity and for decreasing the rotational velocity of the servo motor, at a constant deceleration, from the predetermined rotational velocity to another predetermined rotational velocity; an eighth step for varying the velocity proportional parameter at a predetermined rate; a ninth step for executing the first through third steps; a tenth step for executing an eleventh step under a condition that an error amount between an instructed rotational velocity and an actual rotational velocity of the servo motor is the same as or less than a first amount and that a signal from the servo motor has oscillation of a second amount or less, and for executing the seventh through ninth steps; the eleventh step for designating the rate at which the velocity proportional parameter is alterable to be less than the first value, under a condition that the error amount is a third amount and that the signal from the servo motor has oscillation of a fourth amount, the third amount being the same or smaller than the first amount, and the fourth amount being the same or smaller than the second amount; a twelfth step for executing the seventh through ninth steps and the eleventh steps; and executing a thirteenth step under a condition that the error amount is smaller than the third step and that the signal from the servo motor has oscillation of less than the fourth amount; the thirteenth step for displaying the plurality of control parameters, a signal generated by the servo motor, and a signal for instructing the servo motor to rotate, by the use of display section; a fourteenth step for storing the plurality of control parameters, the signal generated by the servo motor, and the signal for instructing the servo motor to rotate in external memory section: and a fifteenth step for printing at least a portion of an image displayed by the display section, by the use of printer section.

In still another embodiment of the invention, the method further includes: a sixteenth step for deriving an inferred angular acceleration and an integral of torque when the servo motor accelerates; a seventeenth step for deriving an inferred angular acceleration and an integral of torque when the servo motor decelerates; an eighteenth step for: repeating the sixteenth and seventeenth steps under a condition that when a rotational position signal and a velocity signal from the servo motor are compared with, respectively, a rotational position instruction and a rotational velocity instruction, at least one of an error amount and a hunching amplitude is larger than a predetermined value therefor; and repeating the fourth step under a condition that each of the error amount and the hunching amplitude is smaller than the predetermined value therefor; and a nineteenth step for storing the inferred inertia, the inferred angular acceleration, and the integral of torque of the servo motor in the external memory section.

In an adjustment device and method according to the present invention, it is possible to adjust, after initial values of the control gains are set in accordance with inertia of a servo motor and inertia of a load, all the control parameters based on the adjustment of only one of the control parameters.

Moreover, the adjustment of the control parameters can be conducted very easily by a person who is not a skilled or experienced adjustment engineer. The adjustment can be conducted in a simple manner while observing a rotational velocity signal, a rotational position signal, or a torque signal of the servo motor in order to comprehend how the servo motor is controlled, without using a measurement apparatus such as an oscilloscope. The adjustment results, can be kept as data for later use in a readjustment. Furthermore, since alteration of the control gains can be smoothly conducted by pressing a key, a fine adjustment of the control gains is made possible.

In addition, it is possible to let the adjustment device automatically optimize the control parameters, which can be started by pressing a key.

Moreover, an initial adjustment and a read-justment can be easily conducted by inferring the inertia of the servo motor and the load based on torque and acceleration thereof when the servo motor is instructed to accelerate and decelerate.

Furthermore, the loop gain can be set at an adequately high value, since high-mode mechanical resonance of the load of the servo motor is restrained. The resonance, or the magnitude and the frequency thereof, can be detected without using a special measurement apparatus during the adjustment of the control parameters. The adjustment can be conducted using relatively limited hardware and software resources for the adjustment device. The adjustment can be conducted efficiently against possible resonances.

Thus, the invention described herein makes possible the advantages of (1) providing an adjustment device in which it is possible to adjust all the control parameters based on adjustment of only one of the control parameters, and (2) providing an adjustment method in accordance therewith.

These and other advantages of the present invention will become apparent to those skilled in the art upon reading and understanding the following detailed description with reference to the accompanying figures.

BRIEF DESCRIPTION OF THE DRAWINGS

FIG. 5A is a block diagram showing a configuration for a memory in an adjustment device for adjusting control parameters according to a first example of the present invention.

FIG. 5B is a schematic view showing a configuration for a first memory section and an output circuit in an adjustment device for adjusting control parameters according to a first example of the present invention.

FIG. 5C is a waveform diagram of an output signal from an output circuit in an adjustment device for adjusting control parameters according to a first example of the present invention.

FIG. 6A is a block diagram showing a configuration for a display section in an adjustment device for adjusting control parameters according to a first example of the present invention.

FIG. 6B is a waveform diagram as shown in FIG. 5C, with the scales of the abscissa axis (time axis) and the ordinate axis being increased to be twice as large as those of the graph shown in FIG. 5C.

FIG. 14A describes a case where the sampling frequency is 1 kHz, while FIG. 14B describes a case where the sampling frequency is 2 kHz.

DESCRIPTION OF THE PREFERRED EMBODIMENTS

Hereinafter, the present invention will be described by way of examples, with reference to the accompanying drawings.

EXAMPLE 1

Figure 1:
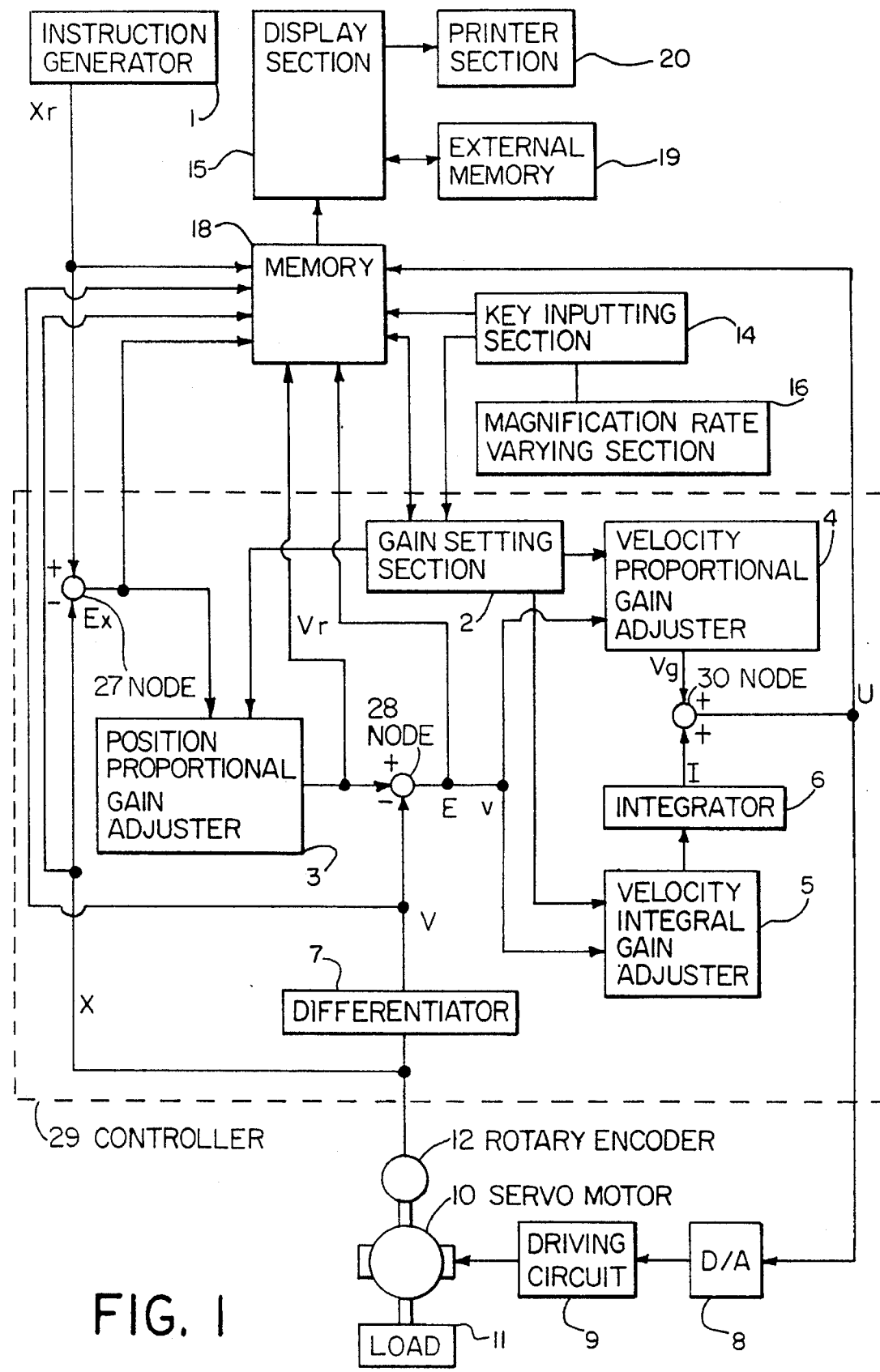
FIG. 1 is a block diagram showing an adjustment device for adjusting control parameters for a servo motor according to a first example of the present invention.

FIG. 1 is a block diagram showing an adjustment device for adjusting control parameters of a servo motor 10 according to a first example of the present invention. As is shown in FIG. 1, the adjustment device includes a controller including an instruction generator 1, a gain setting section 2, a position proportional gain adjuster 3, a velocity proportional gain adjuster 4, a velocity integral gain adjuster 5, an integrator 6, and a differentiator 7. In addition, the adjustment device includes a rotary encoder 12, a key inputting section 14, a display section 15, a magnification rate varying section 16, and a memory 18.

A digital to analog (D/A) convertor 8, and a driving circuit 9 are included in a control system for the servo motor 10 to which a load 11 is applied.

The control system of the servo motor 10 includes a velocity servo system for approximating the velocity of the servo motor 10 to a desired velocity and a position servo system for approximating the rotational position of the servo motor 10 to a desired rotational position.

The velocity servo system includes the velocity proportional gain adjuster 4, the velocity integral gain adjuster 5, the integrator 6, the D/A convertor 8, the driving circuit 9 for the servo motor 10, the rotary encoder 12, and the differentiator 7. A velocity proportional gain is input to the velocity proportional gain adjuster 4 by a controller 29. The response speed of the servo motor 10 can be increased by adjusting the velocity proportional gain. A velocity integral gain is input to the velocity integral gain adjuster 5 by the controller 29. The velocity offset of the servo motor 10 can be reduced by adjusting the velocity integral gain.

The position servo system includes the position proportional gain adjuster 3, the velocity proportional gain adjuster 4, the velocity integral gain adjuster 5, the integrator 6, the D/A convertor 8, the driving circuit 9 for the servo motor 10, end the rotary encoder 12. A position proportional gain is input to the position proportional gain adjuster 3 by the controller 29. The rotational position of the servo motor 10 can be approximated to a desired position by adjusting the position proportional gain. With the load 11 applied to the servo motor 10, rotation information of the servo motor 10 such as rotational position, rotational velocity, rotational acceleration, torque and the like is output from the rotary encoder 12. At least one of the rotational position signal X, rotational velocity signal, rotational acceleration signal, and the torque signal output from the rotary encoder 12 is transferred to the position proportional gain adjuster 3, the differentiator 7, and the memory 18.

As referred to herein, rotation information is defined as a rotational position, a rotational velocity, a rotational acceleration, and torque. However, it will be appreciated that a rotation angle, an angular velocity, and an angular acceleration may be used in the place of the rotational position, the rotational velocity, and the rotational acceleration, respectively. The instruction generator I generates rotation instructions such as a rotational position instruction $X_r$ for commanding a target rotational position of the servo motor 10, a rotational velocity instruction $V_{xx}$ for commanding a target rotational velocity of the servo motor 10, and a torque instruction for commanding a target torque of the servo motor 10. The controller 29 of the adjustment device controls the servo motor 10, to which the load 11 is applied, by a Proportional Integral Derivative (PID) control method, based on the rotation instructions generated by the instruction generator 1 and rotation information generated by the rotary encoder 12.

A rotational position instruction $X_r$ generated by the instruction generator 1 and a rotational position signal X generated by the rotary encoder 12 are input to a node 27. The node 27 subtracts the rotational position signal X from the rotational position instruction $X_x$ and outputs the remainder as a rotational position error amount $E_x$. The rotational position error amount $E_v$ is input to the position proportional gain adjuster 3. The position proportional gain adjuster 3 multiplies the rotational position error amount $E_x$ by the position proportional gain $K_p$ and outputs the resultant product as a rotational velocity instruction $V_r$.

A node 28 receives a rotational velocity signal V obtained by differentiating the rotational position signal X at the differentiator 7 and the rotational velocity instruction $V_r$. The node Z8 subtracts the rotational velocity signal V from the rotational velocity instruction $V_r$ and outputs the remainder as a rotational velocity error amount $E_v$. The rotational velocity error amount $E_v$ is input to the velocity proportional gain adjuster 4 and the velocity integral gain adjuster 5. The velocity proportional gain adjuster 4 multiplies the rotational velocity error amount $E_v$ by the velocity proportional gain $K_{vp}$ and outputs the resultant product as a signal $V_g$. The velocity integral gain adjuster 5 multiplies the rotational velocity error amount $E_v$ by the velocity integral gain $K_{vi}$ and outputs the resultant product as a signal. The integrator 6 integrates this signal and outputs the resultant integral as a signal I.

A node 30 adds the signal $V_g$ and the signal I and outputs the sum as a signal U. The D/A convertor 8 and the driving circuit 9 rotate the servo motor 10 in accordance with the signal U.

The memory 18 selects and stores change(s) over a given period of time of at least one of a rotational position instruction $X_r$ for commanding a target rotational position of the servo motor 10; a rotational position signal X indicative of the rotational position of the servo motor 10; a rotational position error amount $E_x$ indicative of a difference between the rotational position instruction $X_r$ and the rotational position signal X; the rotational velocity instruction $V_{xx}$ for commanding a target rotational velocity of the servo motor 10; a rotational velocity signal V from the differentiator 7; a rotational velocity error amount $E_{vx}$ indicative of a difference between the rotational velocity instruction $V_{xx}$ and the rotational velocity signal V from the differentiator 7: a rotational velocity error amount $E_v$ indicative of a difference between the rotational velocity instruction $V_r$ and the rotational velocity signal V from the differentiator 7; a torque instruction for commanding a target torque of the servo motor 10; a torque of the servo motor 10; and a difference between the target torque and the torque of the servo motor 10. The display section 15 displays output signals of the memory 18 in time sequence. The key inputting section 14 increases and decreases a control gain to be set in the gain setting section 2 corresponding to a pressing of an up-key and a down-key (not shown), the rate of increase/decrease being multiplied by a magnification rate which is varied by the magnification rate varying section 16. The magnification rate is input to the magnification rate varying section 16 by means of a key.

Each section in the portion enclosed by the dotted line in FIG. 1 is preferably implemented using a controller 29 designated generally. However, a part or all thereof may be replaced by other electronic circuitry capable of equivalent operation.

The adjustment device according to the present example may further include an external memory 19 and a printer section 20.

The external memory 19 stores the rotational position instruction, rotational position, rotational position error amount, rotational velocity instruction, rotational velocity, rotational velocity error amount, torque instruction, torque, velocity proportional gain $K_{vp}$, velocity integral gain $K_{vi}$, position proportional gain $K_p$, and the like of the servo motor 10 as time series signals. The display section 15 displays the information stored in the memory 18 numerically and/or graphically. The printer section 20 prints or transfers a displayed image of the display section 15.

Figure 2:
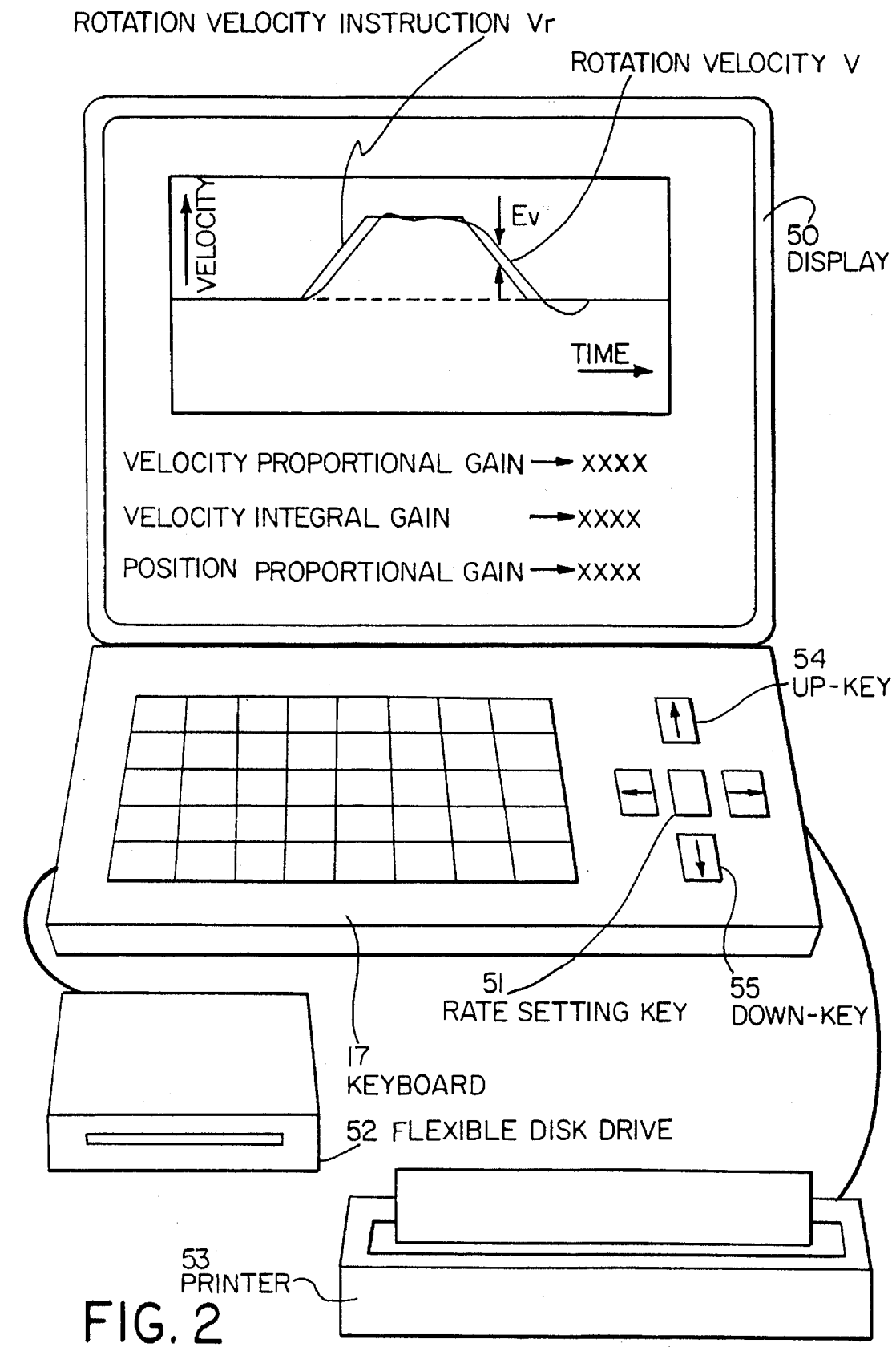
FIG. 2 is a diagrammatic view showing a configuration for an adjustment device for adjusting control parameters, according to a first example of the present invention.

FIG. 2 shows an exemplary configuration for the adjustment device according to the present example. The sections within the portion encircled by the dotted line in FIG. 1 ere realized by using a controller 29 included within the adjustment device. The key inputting section 14 and the magnification rate varying section 16 of FIG. 1 are realized as a keyboard 17 including an up-key 54, a down-key 85, and a rate setting key 51. The display section 15 is realized as a display 50.

A rotational velocity instruction and the change thereof over a given period of time are displayed as a graph in an upper half of the display 50. The axis of ordinates and the axis of abscissas of this graph represent, respectively, velocity and time. In a lower half of the display 50, the current velocity proportional gain, the current velocity integral gain, and the current position proportional gain are displayed. The key inputting section 14, namely, upkey 54, the down-key 55, and the rate setting key 51, is provided on the keyboard 17. Each control gain can be increased and decreased by pressing, respectively, the up-key 54 and the down-key 55. The rate of increase/decrease of each control gain corresponding to one push of the up-key 54/the down-key 55 can be varied by pressing the rate setting key 51. Although the graph and the control gains are displayed in, respectively, the upper half and the lower half of the display 50 in the present example, it is possible to select other display positions for the graph and the control gains as will be appreciated.

The key inputting section 14, the display section 15, and the magnification rate varying section 16, and that which is within the portion enclosed by the dotted line in FIG. 1, can be realized using a note-size personal computer including the aforementioned micro computer therein. The external memory 19 and the printer section 20 can be realized, respectively, as a flexible disk drive 52 of a personal computer, etc., and a printer 53, etc.

Hereinafter, an adjustment method for the control parameters according to the present example will be described.

First, it will be described how to conduct gain adjustment for the control gains so that the phase margin at the gain crossover does not change in amount, based on one selected control gain.

An open-loop transfer function $G_v$ of the velocity loop (the velocity servo system) is represented by Formula I:

$$G_v = \frac{K_{vp} + K_{vi}/S}{(JM + JL) \cdot S} \quad \text{(I)}$$

JM and JL represent, respectively, inertia of a rotor of the servo motor 10 and inertia of the load 11. Assuming S satisfies the relationship S=j (wherein j is an imaginary unit), Formula I can be expressed as Formula II:

$$G_v = \frac{j \cdot K_{vp} \cdot \omega + K_{vi}}{-(JM + JL) \cdot \omega^2} \quad \text{(II)}$$

The following can be said of the velocity proportional gain $K_{vp}$ and the velocity integral gain $K_{vi}$. The value of each of the velocity proportional gain $K_{vp}$ and the velocity integral gain $K_{vi}$ appropriately should be, as has been described, such that the phase margin at the gain crossover is sufficient and that it is possible to set the feedback gain at a sufficiently high value without allowing the control system to be unstable. Each value is considered appropriate if the phase margin at the gain crossover does not change even when the velocity proportional gain is changed. Since the phase margin is expressed in terms of a phase angle (defined as θ), it is necessary to find the conditions under which the phase angle θ remains the same even when the velocity proportional gain is changed. The phase angle θ must first be derived. According to Formula II, the phase angle θ and the open-loop transfer function $G_v$ should satisfy Formula III:

$$\tan\theta = \frac{K_{vp} \cdot \omega}{K_{vi}} \quad \text{(III)}$$
$$= \frac{2\pi \cdot f_0 \cdot K_{vp}}{K_{vi}}$$

π represents the ratio of the circumference of a circle to the diameter thereof. $f_O$ represents the frequency of the gain crossover as described in FIG. 23. If the velocity proportional gain is multiplied by a value Q, Formula II can be expressed as Formula IV (It is assumed that the influence of the velocity integration is negligible in the vicinity of the gain crossover frequency $f_O$):

$$G_v = \frac{j \cdot K_{vp}}{-(JM + JL) \cdot 2\pi \cdot f_0} \quad \text{(IV)}$$

Since the value of $G_v$ is 1 at the gain crossover, Formula IV can be expressed as Formula V:

$$K_{vp} = (JM + JL) \cdot 2\pi \cdot f_O \quad \text{(V)}$$

Figure 23:
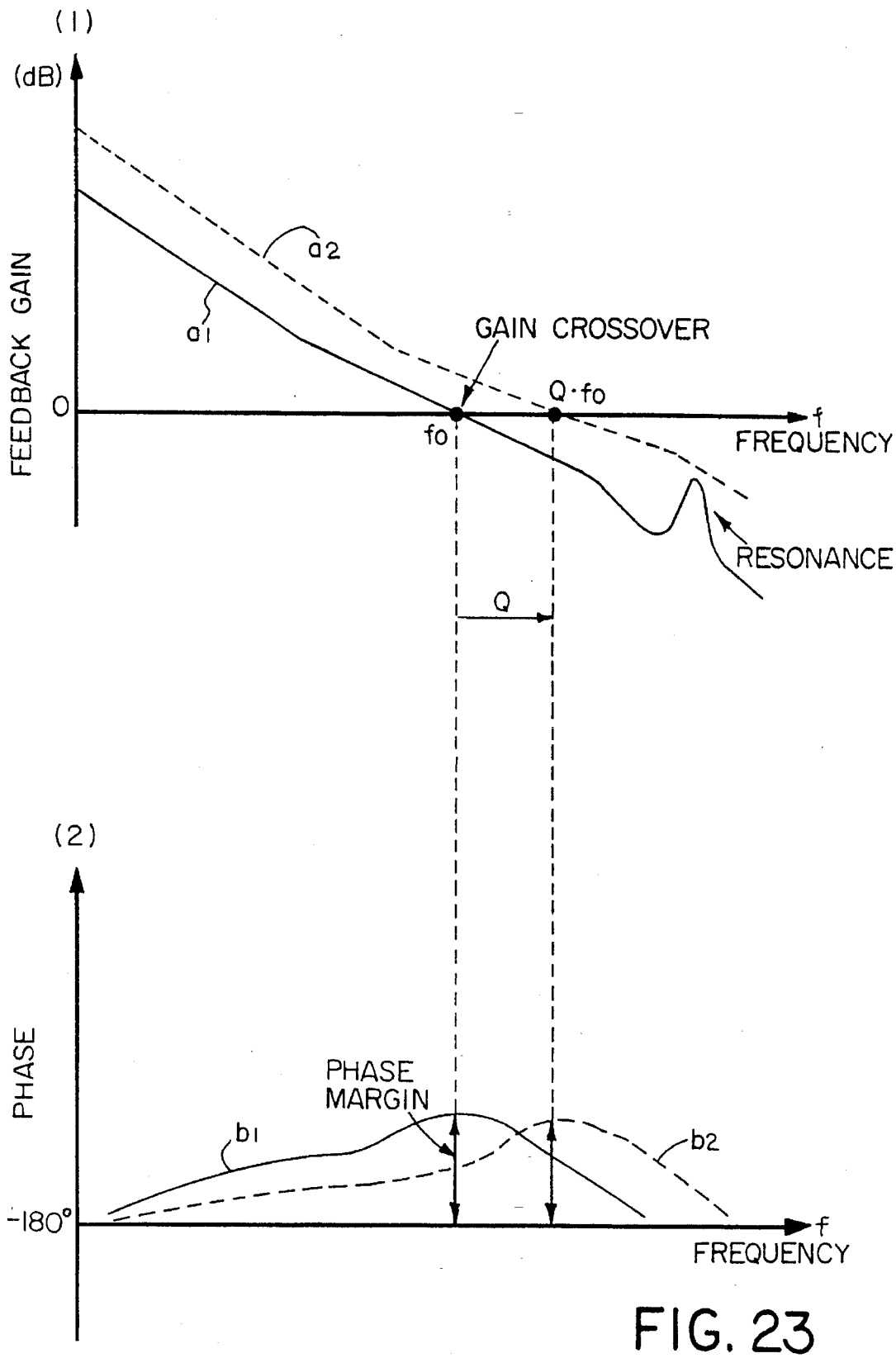
FIG. 23 is a Bode diagram showing frequency characteristics of an open-loop transfer function with respect to velocity of a control system of a servo motor.

As is seen from Formula V, when the velocity proportional gain is multiplied by the value Q, it is necessary to also multiply the gain crossover frequency $f_O$ by the value Q in order that $G_v$ becomes 1 at the gain crossover. The dotted lines in FIG. 23 show a Bode diagram of an open-loop transfer function of the velocity servo system according to the above, the loop starting from a point where a rotational velocity error amount $E_v$ is obtained and ending at a point where a rotational velocity V is obtained. By substituting the equation $K_{vp}'=Q.K_{vp}$ and the equation $f_O'=Q.f_O$ into Formula III and resolving Formula III with respect to a phase angle θ of the open-loop transfer function $G_v$, when the velocity proportional gain is multiplied by the value Q, Formula VI is obtained:

$$\tan\theta' = \frac{2\pi \cdot f_0 \cdot Q \cdot K_{vp}}{K_{vi}'} \quad \text{(VI)}$$

Herein, the condition under which the phase angle (or the phase margin at the gain crossover) does not change is tan θ=tan θ'. Therefore, according to Formula III and Formula VI, Formula VII is obtained:

$$K_{vi}' = Q^2 \cdot K_{vi} \quad \text{(VII)}$$

Thus, it has been made clear that the velocity integral gain is kept at an appropriate value even when the velocity proportional gain is changed, under the condition that the velocity integral gain is multiplied by the square of the change in the velocity proportional gain.

Figure 4:
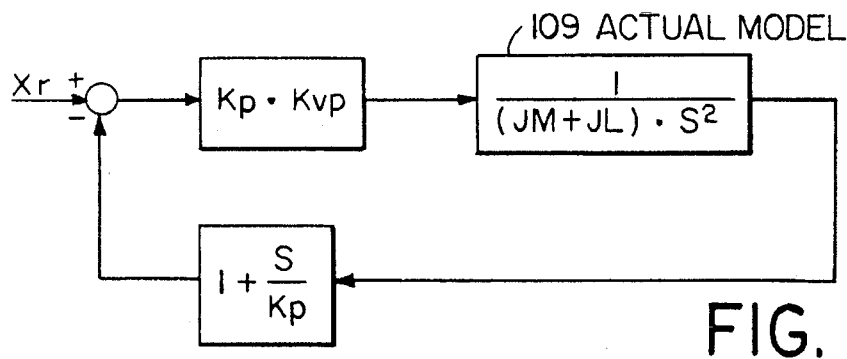
FIG. 4 is a block diagram showing a configuration for a control system of a servo motor, a position loop thereof being replaced by a circulating loop.
Figure 21:
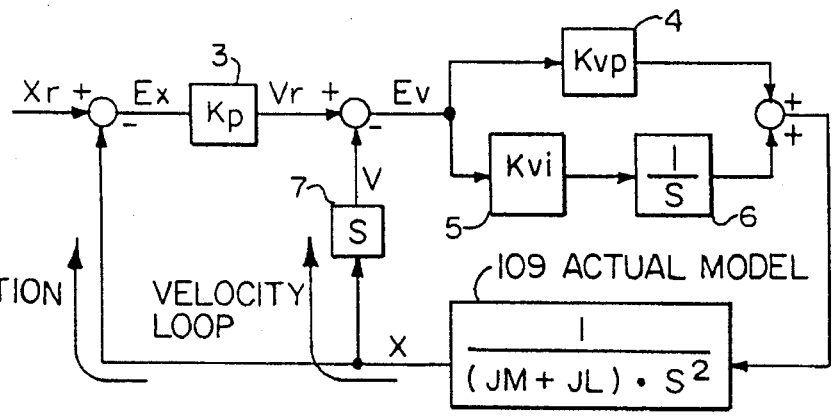
FIG. 21 is a block diagram showing a control system of a conventional servo motor.
Figure 22:
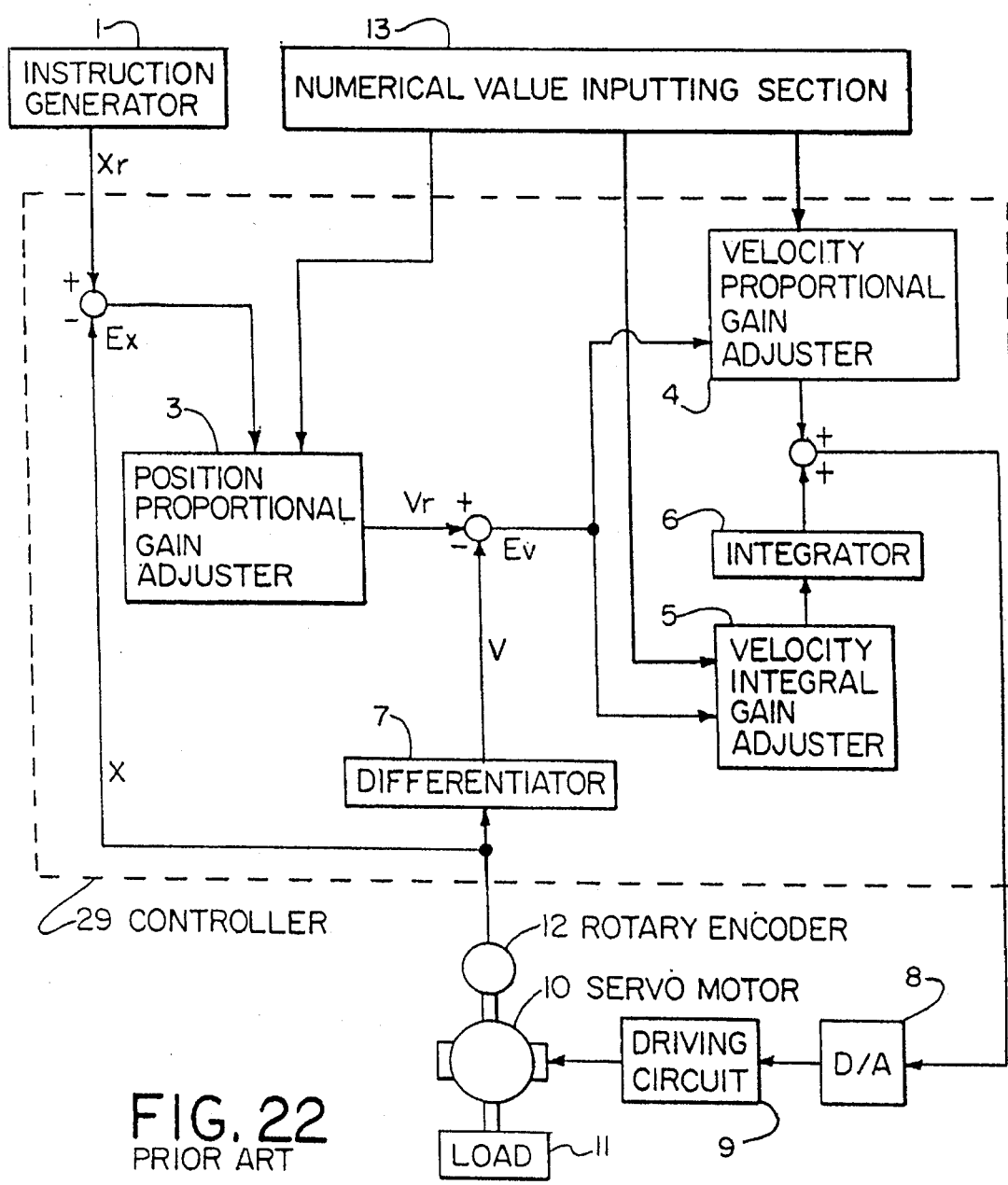
FIG. 22 is a block diagram showing a conventional adjustment device for adjusting control parameters of a servo motor.

The condition under which the position proportional gain stays at an appropriate value even when the velocity proportional gain is changed can be obtained in a similar manner. For conciseness, the position loop (the position servo system) shown in FIG. 21 is replaced by a circulating loop shown in FIG. 4, assuming that the velocity integral gain $K_{vi}$ is zero. An open-loop transfer function $G_x$ of the position loop is represented by Formula VIII:

$$G_x = \frac{K_p \cdot K_{vp} + K_{vp} \cdot S}{(JM + JL) \cdot S^2} \qquad \text{(VIII)}$$

$$= \frac{K_p \cdot K_{vp} + j \cdot K_{vp} \cdot \omega}{-(JM + JL) \cdot \omega^2}$$

Resolving Formula VIII with respect to the phase angle θ gives Formula IX:

$$\tan\theta = \frac{2\pi \cdot f_0}{K_p} \qquad \text{(IX)}$$

The phase angle θ' of the open-loop transfer function $G_v$ when the gain crossover frequency is multiplied by the value Q satisfies Formula X:

$$\tan\theta' = \frac{2\pi \cdot Q \cdot f_0}{K_p'} \qquad \text{(X)}$$

Herein, the condition under which the phase angle (or the phase margin at the gain crossover) does not change is tan θ=tan θ'. Therefore, according to Formula IX and Formula X, Formula XI is obtained.

$$K_p' = Q \cdot K_p \qquad \text{(XI)}$$

Thus, it has been made clear that the position proportional gain is kept at an appropriate value even when the velocity proportional gain is changed, under the condition that the position proportional gain is multiplied by the square of the change in the velocity proportional gain.

An operation of the adjustment device for adjusting control parameters of a servo motor according to the present example, by which the above-mentioned method is performed, will be described.

Figure 3A:
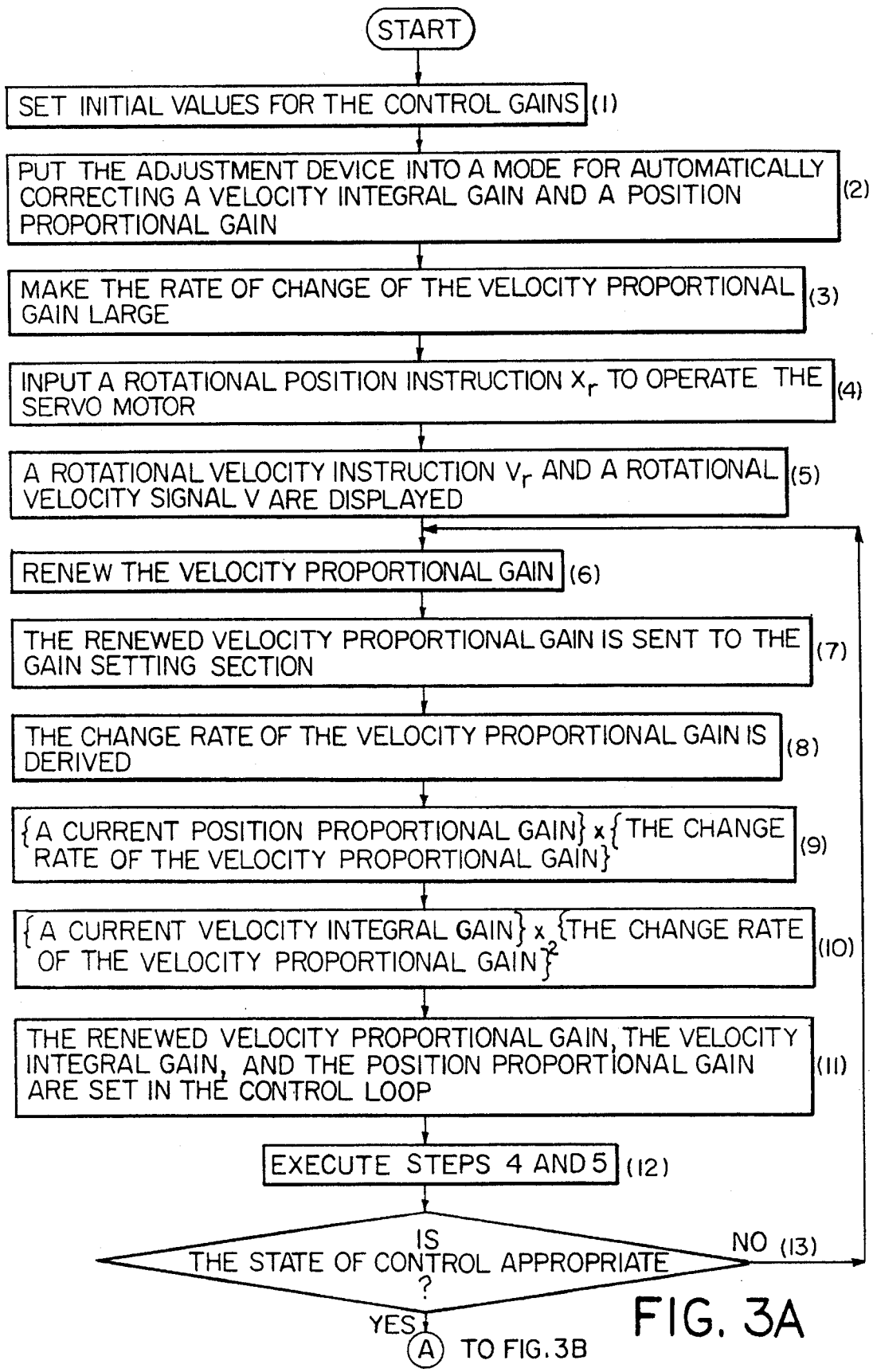
FIG. 3 is a flow diagram showing a flow of control in an operation of an adjustment device for adjusting control parameters according to a first example of the present invention.
Figure 3B:
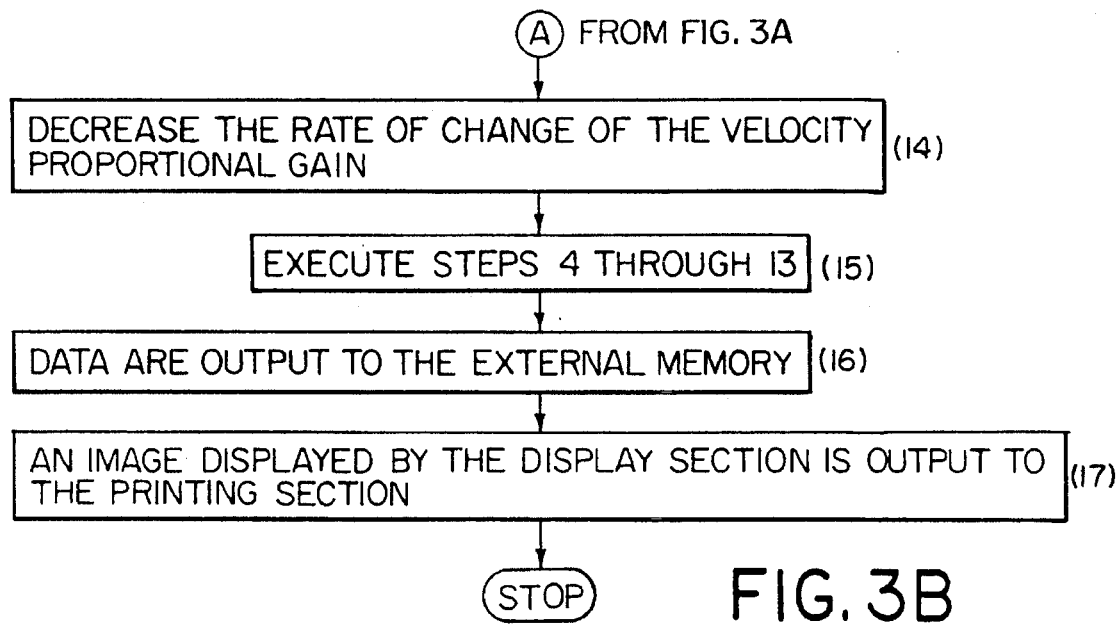

FIG. 3 is a flowchart showing a flow of control in an operation of the adjustment device for adjusting the control gain of the servo motor 10 according to the present example. First, inertia of the servo motor 10 and inertia of the load 11 are derived using known techniques based on physical principles related to servo motors. Alternatively, the inertia of the servo motor 10 and the inertia of the load 11 may be estimated through approximation from an input voltage to the servo motor 10 and output signals from the rotary encoder 12 as will be appreciated. Based on the value of the inertia of the servo motor 10 and the value of the inertia of the load 11, initial control gains are set by the operator by way of the key inputting section 14 or automatically by the controller 29 based on the above parameters (Step 1).

Next, the adjustment device is put into a mode for automatically correcting a velocity integral gain and a position proportional gain in accordance with a change in a velocity proportional gain as initiated by the operator via the key inputting section 14 (Step 2). The rate of change from a first value of a velocity proportional gain to s renewed value, corresponding to each pressing of the key inputting section 14, is altered by means of the magnification rate varying section 16. At the beginning of the adjustment, the rate of change of the velocity proportional gain is made large by the operator via the magnification rate varying section 16 so as to conduct a coarse gain adjustment, whereby the time required for the adjustment can be reduced (Step 3). In Step 4, the instruction generator 1 inputs a rotational position instruction $X_r$ and in response the controller 29 sequentially performs the following: raising the rotational velocity of the servo motor 10 to a predetermined velocity at a constant rotational acceleration; maintaining the predetermined velocity for a predetermined period of time; lowering the rotational velocity to an opposite of the predetermined velocity at an opposite of the constant rotational acceleration. Such an increase and subsequent decrease in the rotational velocity V is displayed on the display no super posed over the corresponding rotational velocity instruction $V_r$ as shown in FIG. 2. Then, it is possible to generate rotational velocity instruction $V_r$ or rotational acceleration instruction for processing Step 4 then the predetermined period of time may be 0 (Step 4).

The display 50 displays a current rotational position instruction $V_r$ from the instruction generator 1, a rotational velocity signal V from the rotary encoder 12, and the control gain from gain setting section 2 as is shown in FIG. 2 during the adjusting of the control gain (Step 5). The operator observes the displayed waveforms on the display 50, whereby it is made possible to comprehend how the servo motor 10 is controlled. If the error amount $E_v$ between the rotational velocity instruction $V_r$ and the rotational velocity signal V is large as determined by the operator based on a predefined criteria by viewing the amount $E_v$ shown on the display 50, the velocity proportional gain is to be increased by way of the operator depressing the up-key 54 (Step 6) and the gain setting section 2 increasing the velocity proportional gain based on such input (See Step 11). If the rotational velocity signal V is slightly oscillating (e.g. portion A) as determined by the operator based on a predefined criteria by viewing the waveform for the rotational velocity signal V with respect to time on the display 50, the operator presses the down-key 55 (Step 6) in order that the velocity proportional gain is also decreased by the gain setting section 2 (See Step 11). Thus, it will be appreciated that when the velocity proportional gain is renewed by the gain setting section 2, as in the above-mentioned situation, the up-key 54 or the down-key 55 of the key inputting section 14 is pressed by the operator (Step 6).

In Step 7, the renewed velocity proportional gain is sent to the gain setting section 2 in response to the input from the operator in Step 6. The old velocity proportional gain is stored by the gain setting section 2 along with the renewed velocity proportional gain value. The change rate Q of the velocity proportional gain is defined as a ratio of the old velocity proportional gain to the renewed velocity proportional gain (Step 8).

A position proportional gain is multiplied by the change rate Q of the velocity proportional gain thus defined according to the adjustment principle for control gains that was described earlier (Step 9). A current velocity integral gain $K_{vi}$ is multiplied by the square of the change rate Q in the velocity proportional gain in the gain setting section 2 (Step 10).

The gain setting section 2 transfers the renewed velocity proportional gain $K_{vp}$, the multiplied position proportional gain $K_p$, and the multiplied velocity integral gain $K_{vi}$ to the velocity proportional gain adjuster 4, the position proportional gain adjuster 3, and the velocity integral gain adjuster 5, respectively. The position proportional gain adjusters 3 multiplies an input control signal $E_x$ by the transferred position proportional gain $K_p$, the velocity proportional gain adjusters 4 multiplies an input control signal $E_v$ by the transferred velocity proportional gain $K_{vp}$, the velocity integral gain adjusters 5 multiplies an input control signal $E_v$ by the transferred velocity integral gain $K_{vi}$ (Step 11). It will be appreciated that Steps 7 through 11 are programed to be carried out automatically by the controller 29. Next, in Step 12 the above-described Steps 4 and 5 are repeated and the display 50 is updated while the state of control of the servo motor 10 is observed by the operator. If the error amount $E_v$ between the rotational velocity instruction $V_r$ and the rotational velocity signal V has increased from what it was at the beginning of the adjustment as determined by the operator (or automatically by the controller 29 in an alternated embodiment using conventional data analysis techniques), Steps 6 to 12 are repeated. If the rotational velocity signal V is found to be oscillating by the operator, the device returns to Step 6 and Steps 6 to 12 are performed again (Step 13). If the error amount $E_y$ has decreased from what it was at the beginning of the adjustment and if the oscillation of the rotational velocity signal V is within a preselected acceptable range as determined by the operator, the rate of change of the velocity proportional gain is decreased via the magnification rate varying section 16 because it is presumable that the state of control is nearly appropriate (Step 14). Next, in Step 15 the above-described Steps 4 to 13 are performed again, whereby a finer adjustment is conducted. On confirming that the error amount $E_v$ is sufficiently small and that the rotational velocity signal V is not oscillating based on the display 50, the adjustment proceeds to Step 16. Data of results of the gain adjustment, the various parameters, and the various control signals are output to the external memory 19 (Step 16). An image displayed by the display section 15 is output to the printer section 20 (Step 17) in response to a print request input (not shown) provided by the operator to the key inputting section 14. Thus, the adjustment for the control gain has been completed.

FIG. 5A is a view showing a configuration for the memory 18. As is shown in FIG. 5, the memory 18 includes a selecting circuit 31 for selecting and outputting a designated at least one of the rotational position instruction $X_r$, the rotational position signal X, the rotational position error amount $E_x$, the rotational velocity instruction $V_r$, the rotational velocity signal V, and the rotational velocity error amount $E_v$. The selecting circuit 31 conducts the above-mentioned selection in accordance with a selection signal from the key inputting section 14. The memory 18 also includes a first memory section 32 for storing the output signal from the selecting circuit 31 and an output circuit 33 for generating a signal in accordance with predetermined reference amplitude levels for selecting a signal to be displayed by the display section 15 or stored in the external memory 19. The reference amplitude levels have a high reference amplitude level and s low reference amplitude level.

FIG. 5B is a view showing a configuration for the first memory section 32 and the output circuit 33. As is shown in FIG. 5B, the first memory section 32 includes a number n of memory units $R_1, R_2, \ldots, R_{n-1}$, and $R_n$. The output circuit 33 includes a number n of output switches $S_1, S_2, \ldots, S_{n-1}$, and $S_n$, each switch corresponding to a respective one of the memory units $R_1, R_2, \ldots, R_{n-1}$, and $R_n$. A signal input to a memory unit $R_i$ (wherein i is an integer; $1 \leq i \leq n-1$) is temporarily stored wherein, and sequentially transferred to a memory unit $R_{i+1}$ in accordance with a timing signal that is generated gain setting section 2. When the amplitude level of the signal input to the first memory section 32 becomes larger than the low reference amplitude level and smaller than the high reference amplitude level, the output circuit 33 closes an output switch $S_k$ (wherein k is an integer; $2 \leq k \leq n$) corresponding to the memory unit $R_k$ which stored the output signal from the selecting circuit 31 for first time. Then, opening the output switch $S_k$, the output circuit 33 transfers a signal stored in a memory unit $R_{k-1}$ to the memory unit $R_k$ in accordance with the timing signal. Then, the output switch $S_k$ is closed. The above mentioned operation is repeated, while the output circuit 33 outputs the signal input to the memory units $R_1, R_2, \ldots, R_{n-1}$, and $R_n$ to the display section 15. As soon as the last signal input to the first memory section 32 is output, the output switch $S_k$ is opened again.

Alternatively, a signal stored in the memory units $R_1, R_2, \ldots, R_{n-1}$, and $R_n$ can be output to the display section 15 by closing and opening the output switches $S_n, S_{n-1}, \ldots, S_2$, and $S_1$ in this order. As may easily be seen, it is possible to obtain a signal stored in a given memory unit $R_i$ by feeding the output circuit 33 with information indicating the corresponding output switch by means of the key inputting section 14. Moreover, the coarseness and range of a time axis of a Graph of the Signal, displayed by the display section 15, can be independently designated by varying intervals of the timing signal.

FIG. 5C shows the waveform of an output signal from the output circuit 33. In FIG. 5C, the axis of abscissas represents time, while the axis of ordinates represents the number of revolutions per minute (rpm) of the servo motor 10. It is so preselected that a trigger signal is generated when the amplitude level exceeds 100 rpm, so that the display section 15 starts displaying the waveform graph. However, the waveform can be observed starting from a point in time 1 msec before the trigger signal is generated.

It is also possible to preselect that the trigger signal is to be generated at a point one quarter of the way, measured from the beginning, across the whole time the graph is displayed, or at a point one eighth of the way, measured from the end, across the whole time the graph is displayed. It is also possible to generate a trigger signal at a point where the output signal from the output circuit 33 decreases over time.

FIG. 6A shows an exemplary configuration for the display section 15. As is shown in FIG. 6A, an output from the memory 18 is temporarily stored in a second memory section 41. Display scales of the axis of abscissas and the axis of ordinates can be varied by means of a display scale varying section 42. An output from the display scale varying section 42 is input to a third memory section 43. A display device 44 displays an output signal from the third memory section 43 along with data of a display frame, etc. The printer section 20 prints the output signal, the display frame, and the like displayed on the display device 44 on paper. The printer section 20 is also capable of printing on paper a magnified image or a reduced image of a portion of what is displayed on the display device 44.

The external memory 19 stores the signal stored in the second memory section 41 along with the adjusted control gains. Data of the predetermined reference amplitude level, a display range in the direction of the amplitude, a display range in the direction of the time axis, the display scales, intervals of the timing signal, and the like are stored in the external memory 19 or a semiconductor memory, etc. (not shown) included in the display device 44. Signals stored in the external memory 19 are transferred to the second memory section 41 so as to be subjected to the same display process as the output signal from the memory 18 is subjected to.

FIG. 6B is a view showing the waveform shown in FIG. 5C, with the scales of the axis of abscissas (time axis) and the axis of ordinates being increased to be twice as large as those of the graph shown in FIG. 5C. As exemplified in FIG. 6B, it is possible to display the same waveform in a different display scale on the display device 44, using the display scale varying section 42 in the configuration shown in FIG. 6A.

In the present example, a change rate of the velocity proportional gain is identified by the gain setting section 2 for conducting correction for the velocity integral gain and the position proportional gain. However, it is also possible to identify a change rate of the velocity integral gain or the position proportional gain and conduct correction for the remaining two control gains. For example, it is possible to identify a change rate of the position proportional gain, correct the velocity proportional gain based on the identified change rate, and correct the velocity integral gain based on the square of the identified change rate.

In the present example, the initial appropriate values for the control gains are set based on the inferred inertia JL of the load 11. However, it is also possible to set the initial values of the control gains according to acquired skills or principles learned through the experience of the individual adjustment engineer.

In the present example, the control parameters are adjusted while the rotational velocity instruction $V_r$ and the rotational velocity signal V are observed by means of the display section 15. However, it is also possible to observe the rotational velocity error amount $E_v$, the rotational position instruction $X_r$, the rotational position error amount $E_x$, the torque instruction or the torque signal in order to adjust the control parameters.

As has been described, according to the present example, when a velocity proportional gain, as one of such control parameters as a position proportional gain, a velocity proportional gain, a velocity integral gain that are included in a control system of a servo motor, is changed, for example, the velocity integral gain and the position proportional gain are corrected accordingly. More specifically, after setting the gain crossover in, at an initial stage of the gain adjustment, a sufficiently low frequency band where the servo motor is unlikely to have mechanical oscillation, it becomes possible to adjust all the control parameters by only adjusting the velocity proportional gain, for example. Even a person who is not a skilled or experienced adjustment engineer can easily conduct the adjustment of the control parameters so that the feedback gain is sufficiently large and within a range where the servo motor does not have mechanical resonance.

The state of control of the servo motor can always be understood by means of a display section 15 which displays change over time of at least one of the rotational position instruction, rotational position signal, rotational position error amount, rotational velocity instruction, rotational velocity signal, rotational velocity error amount, torque instruction, torque signal, and the torque error amount. Therefore, an adjustment engineer can conduct the adjustment of the control parameters while knowing the state of control of the servo motor by monitoring an image displayed by the display section, without using a measurement apparatus such as an oscilloscope.

Moreover, it is possible to gradually change a control gain by pressing an input key of a key inputting section, whether to increase or decrease the control gain. Gradually changing the control gain while the state of control of the servo motor is being monitored on the display helps prevent such a mishap as letting an excess oscillation be generated because of a sudden change in the state of control of the servo motor due to inputting a value which is outside an appropriate range for the control gain.

Moreover, it is possible to vary the accuracy of adjustment for the control parameters since a magnification rate varying section for varying the rate of increase/decrease corresponding to one pressing of the key inputting section is provided. Therefore, it is made possible to increase the rate of increase/decrease at an initial stage of the adjustment so as to conduct a coarse adjustment, and then decrease the rate so as to conduct a fine adjustment. Thus, it is made easy to input a slightly increased/decreased value for each control gain, as compared with repeating the inputting of all digits of a control gain many times, which would make fine adjustment difficult.

The key inputting section 14 may include a switch for activating an automatic adjustment mode under which the gain control is conducted automatically by the controller 29 according to the principles described herein.

Moreover, the adjustment device according to the present example includes: a memory for storing at least one of a rotational position instruction, a rotational position signal, a rotational position error amount, a rotational velocity instruction, a rotational velocity signal, a rotational velocity error amount, a torque instruction, a torque signal, and a torque error amount; a display section for displaying an output signal from the memory; an external memory 19 for storing the output signal through half eternity; and a printer section 20 for printing an image displayed by the display section 15. Therefore, it is made possible to always understand and preserve as data the state of control of the servo motor. By monitoring an image displayed by the display section, the adjustment of the control parameters can be conducted while a rotational position instruction, a rotational position signal, a rotational position error amount, a rotational velocity instruction, a rotational velocity signal, a rotational velocity error amount, a torque instruction, a torque signal, and a torque error amount are grasped by an adjustment engineer. The adjustment results of the control parameters such as control gains can be kept as data for later use.

EXAMPLE 2

Figure 7:
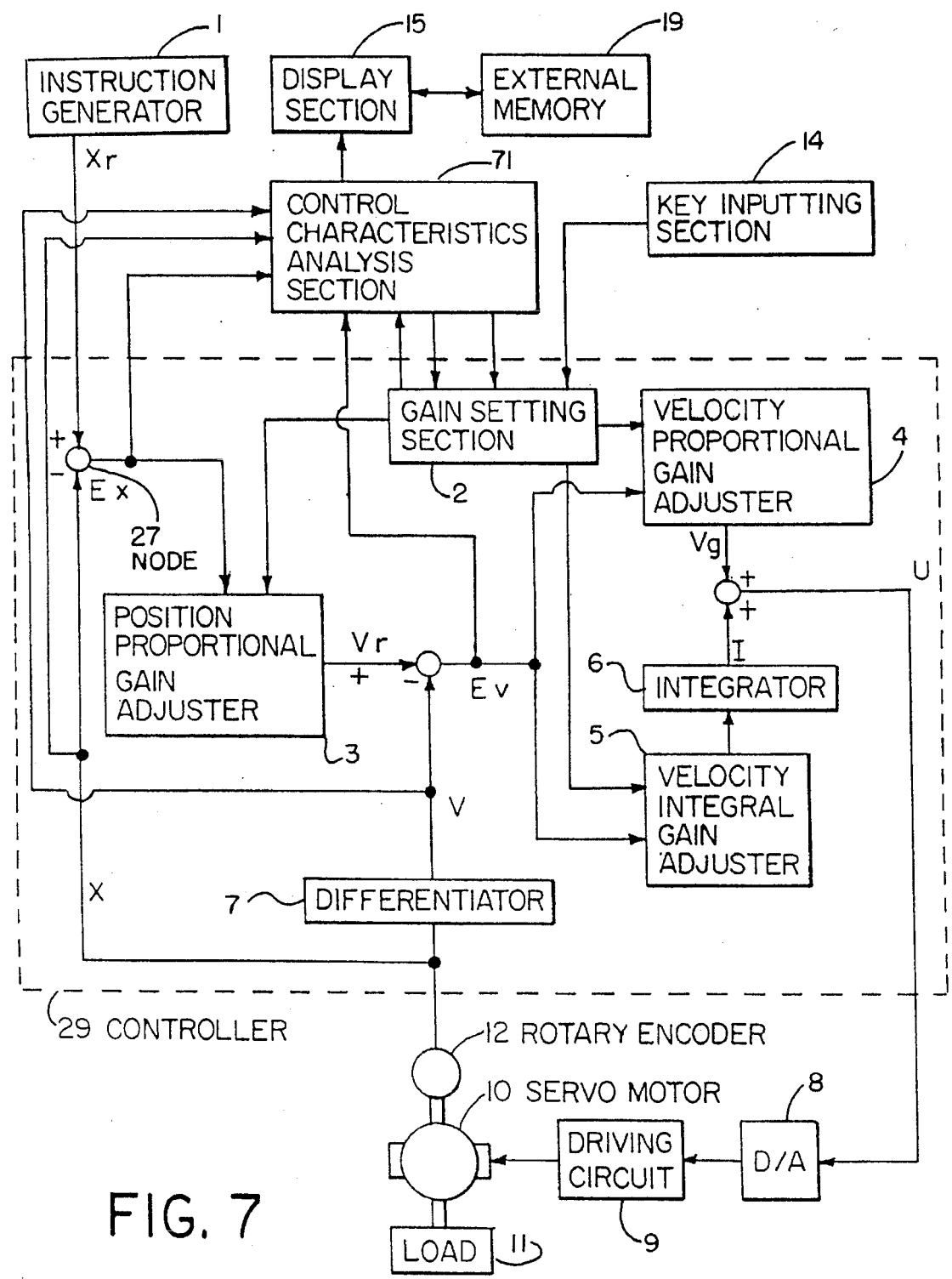
FIG. 7 is a block diagram showing an adjustment device for adjusting control parameters according to a second example of the present invention.

FIG. 7 is a block diagram showing an adjustment device for adjusting control parameters according to a second example of the present invention. Elements which correspond to those in the first example are indicated by the same reference numerals. As a result, descriptions thereof are omitted. The adjustment device of the second example is the same as that of the first example except that it further includes a control characteristics analysis section 71. The control characteristics analysis section 71 receives: a rotational position signal X output from the rotary encoder 12, a rotational velocity signal V obtained by differentiating the rotational position signal X using the differentiator 7; a rotational position error amount $E_x$ which is a difference between the rotational position signal X and a rotational position instruction $X_r$ output from the instruction generator 1; and a velocity error amount $E_v$ which is a difference between the rotational velocity signal V and a rotational velocity instruction $V_r$.

Figure 8:
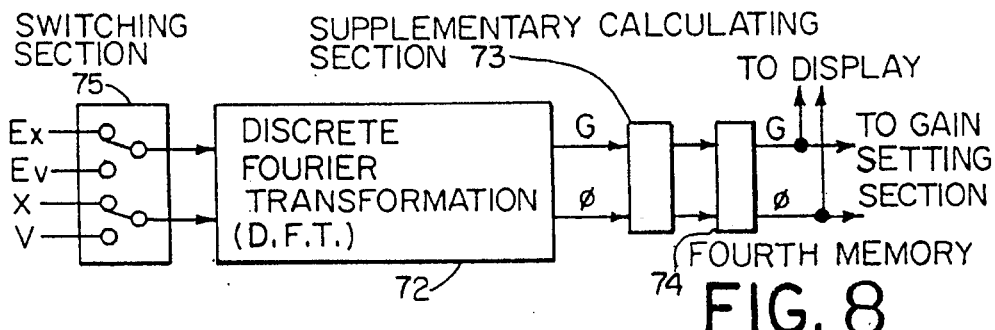
FIG. 8 is a block diagram showing a configuration for a control characteristics analysis section in an adjustment device for adjusting control parameters according to a second example of the present invention.

The instruction generator 1 Outputs to the servo motor a rotation instruction (e.g. rotational position instruction $X_r$, rotational velocity instruction $V_r$, or rotational acceleration instruction) which is in the vicinity of a gain crossover frequency of the position servo system or the velocity servo system, the waveform of the rotation instruction being a sine wave shape. FIG. 8 is a block diagram showing the control characteristics analysis section 71. As is shown in FIG. 8, the control characteristics analysis section 71 includes a Discrete Fourier Transformation section 72. The Discrete Fourier Transformation section 72 analyzes the open-loop characteristics of the position servo system, that is, the relationship between gain values and frequencies and the relationship between phases and frequencies in a portion starting from a point where the rotational position error amount $E_x$ is obtained and ending at a point where the rotational position signal x is obtained. The analysis results are output to a supplementary calculating section 73. Alternatively, the Discrete Fourier Transformation section 72 may analyze an open-loop characteristics of the velocity servo system, that is, the relationship between gain values and frequencies and the relationship between phases and frequencies in a portion starting from a point where the rotational velocity error amount $E_v$ is obtained and ending at a point where the rotational velocity signal V is obtained. In either case, the analysis results are output to a supplementary calculating section 73. The supplementary calculating section 73 is capable of deriving various data based on such data as gain values, phases, and frequencies, which are all measured at several points. The data to be derived are: an approximate gain crossover frequency $f_0$, at which the gain value is 0 dB; and a phase at the gain crossover frequency. A fourth memory 74 stores the data of gain values, phases, and frequencies obtained at the supplementary calculating section 73. A switching section 75 switches between parameters concerning the rotational position (i.e. the rotational position error amount $E_x$ and the rotational position signal X) and parameters concerning the rotation velocity (i.e. the rotational velocity error amount $E_v$ and the velocity signal V), which parameters are input to the Discrete Fourier Transformation section 72.

Hereinafter, an operation of the adjustment device of the present example will be described. In the present example, the control gains are set, by means of a key inputting section 14, without confirming responses of the control system corresponding to any pressing of an up-key 54 or a down-key 55. Instead, the control gains are automatically adjusted by the controller 29 so that optimum characteristics are obtained. After an inputting of relevant values is completed, change in the gain and the phase at the gain crossover are monitored by an adjustment engineer, the data of gains and phases being output to gain setting section 2 and display 50 from the control characteristics analysis section 71.

Figure 9:
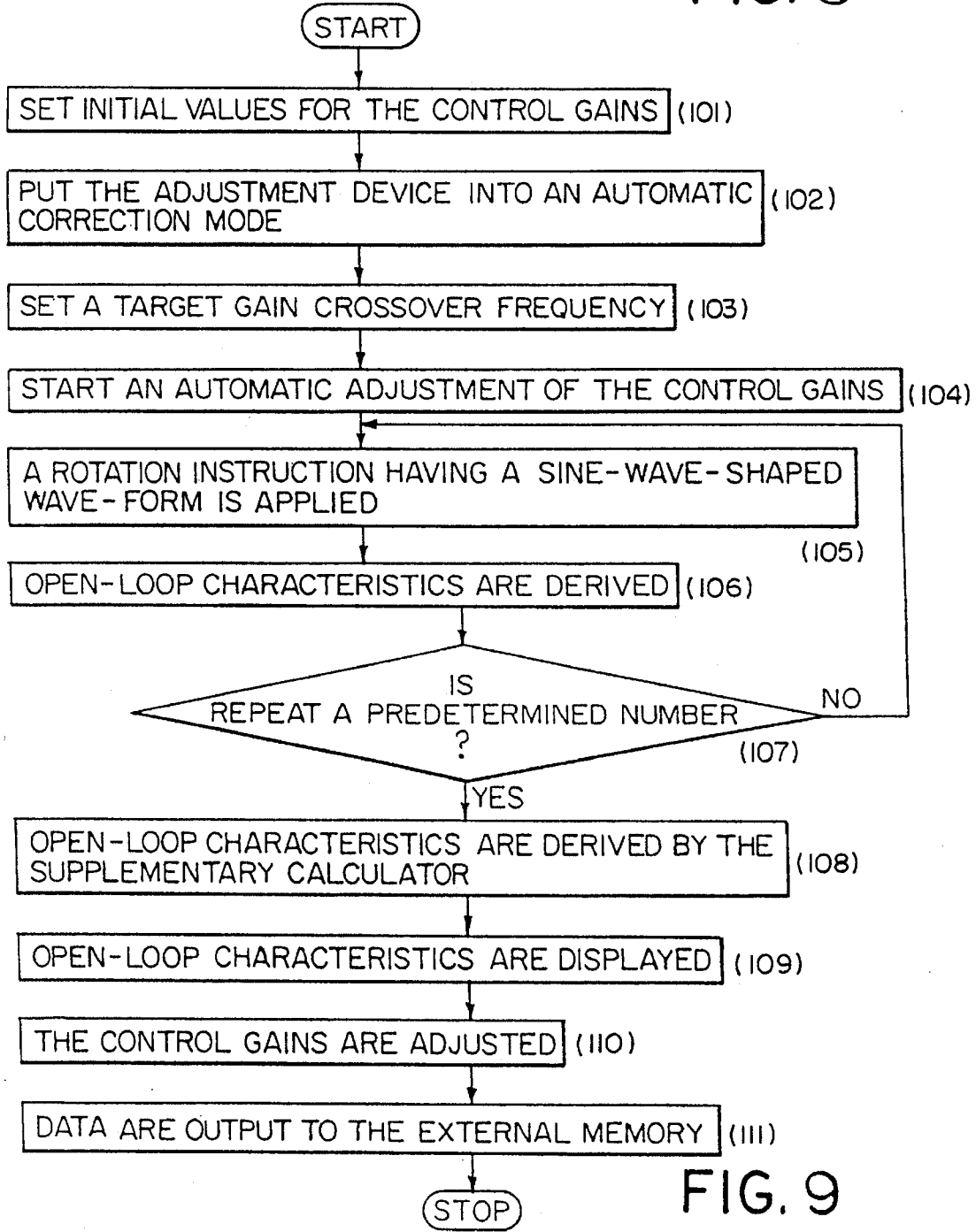
FIG. 9 is a flow diagram showing a flow of control in an operation of an adjustment device for adjusting control parameters according to a second example of the present invention.

FIG. 9 is a flow chart diagram showing a flow of control in an adjustment method for the control parameters of the servo motor 10 according to the present example.

Initially, the control gains are input by the operation via the key inputting section 14 at such values that the servo motor 10 operates with the gain crossover frequency $f_0$ being sufficiently low so as not to let the load 11 oscillate (Step 101).

Next, the key inputting section 14 is manipulated by the operator so that the adjustment device is switched into a mode for automatically adjusting the control gains, namely, a velocity proportional gain, a velocity integral gain, and a position proportional gain (Step 102). A target response speed of the servo motor 10 and a target gain crossover frequency are set (Step 103) in response to input values provided by the operator via the key inputting section 14.

The key inputting section 14 is manipulated so as to start an automatic adjustment of the control gains (Step 104). It is predetermined that the control gains will need to increase as a result of the control gain initially being sufficiently low. Thus, the instruction generator 1 outputs a rotation instruction having a frequency in the vicinity of the target gain crossover frequency to a node 27, the waveform of the rotation instruction being a sine-wave-shaped (Step 105).

When the gain of the position servo system is to be adjusted, a number Nu of gain values, a number Nu of phases, and a number Nu of frequencies are derived by the Discrete Fourier Transformation section 72 in the control characteristics analysis section 71, based on the rotational position error amount $E_x$ and the rotational position X. The supplementary calculating section 73 derives a gain crossover frequency based on the number Nu of gain values, the number Nu of phases, and the number Nu of frequencies thus obtained (Step 106).

When the gains of the velocity servo system is to be adjusted, a number Nu of gain values, a number Nu of phases, and a number Nu of frequencies are derived in a similar manner, based on the velocity error amount $E_v$ and the velocity signal V. Step 105 and Step 106 are repeated by the controller during a predetermined number (Step 107).

After selecting a number Nu of frequencies in the vicinity of the gain crossover frequency obtained in Step 106 by controller 29, a number Nu of gain values and e number Nu of phases corresponding to the number Nu of frequencies thus selected are derived by repeating Steps 105 and 106. A gain crossover frequency, a phase at the gain crossover frequency and a frequency of the above-mentioned maximum phase are derived by the supplementary calculating section 73 (Step 108).

While Steps 105 to 108 are performed, the display section 15 displays gain characteristics and phase characteristics (Step 109).

Next, a frequency is derived at which a phase margin, that is, the difference between a phase of the gain crossover frequency and −180° falls within a predetermined range. The control gains are gradually changed so that the gain crossover frequency meets the frequency thus derived by gain setting section 2 (Step 110).

Finally, the gain crossover frequency thus obtained and the phase margin thereat are input to an external memory 19 (Step 111).

As has been described, according to the present example, frequency characteristics and phase characteristics of the gain crossover of the control system can be derived by means of the control characteristics analysis section 71, corresponding to one pressing of the key inputting section 14. The control gains are increased until they attain such a predetermined relationship that the phase margin falls within a predetermined range of, preferably, 30° to 50°. Thus, it is made possible to adjust automatically the control gains so that the gain crossover frequency becomes maximum with the phase margin following within the predetermined range. The control gains may also be readjusted so that the phase margin falls within the range of 40° to 45°, whereby robust stability can be obtained.

The adjustment device of the present example can sufficiently operate without having the memory 18 incorporated in the adjustment device of the first example as will be appreciated.

EXAMPLE 3

Figure 10:
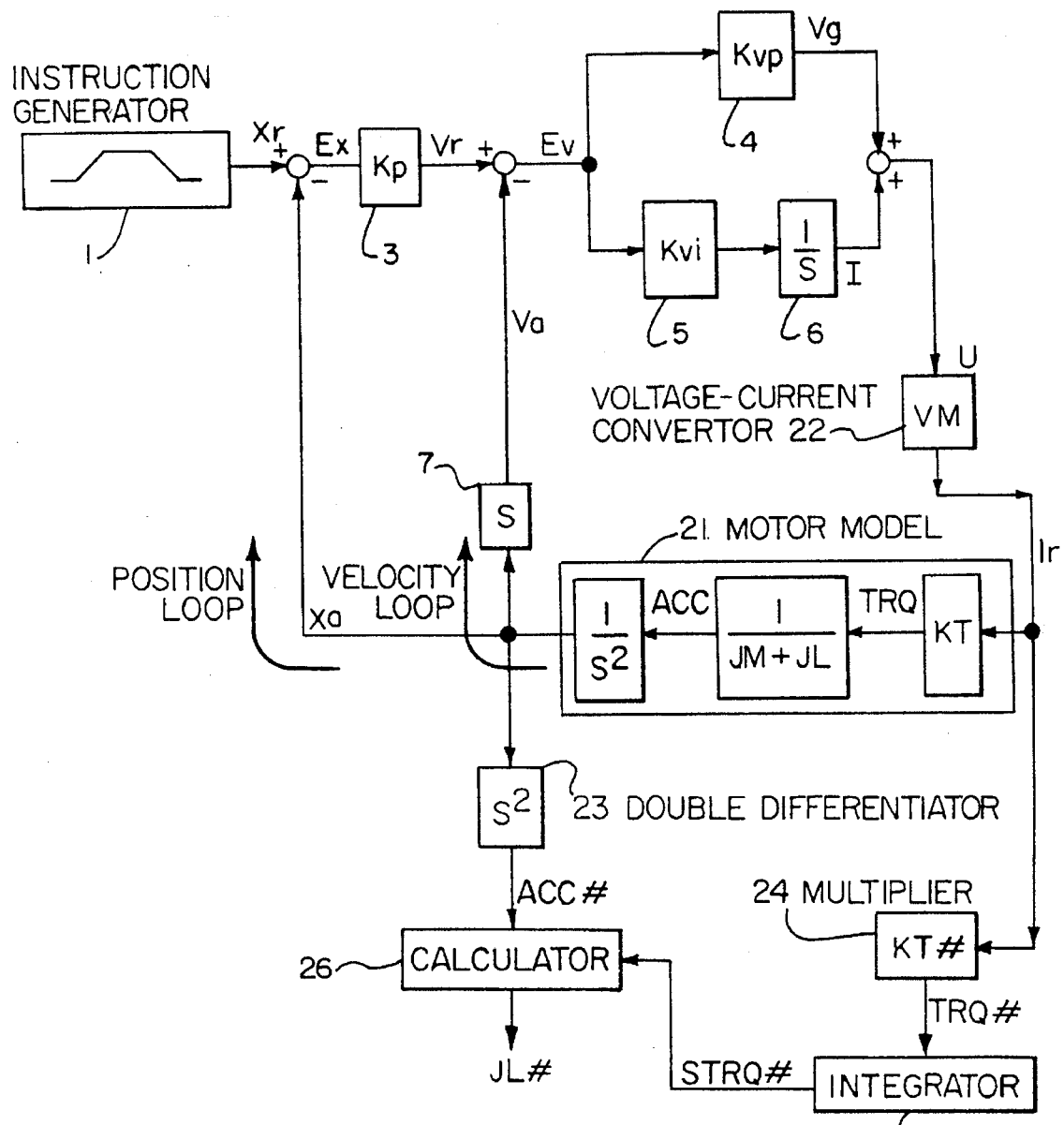
FIG. 10 is a block diagram showing an adjustment device for adjusting control parameters according to a third example of the present invention.

FIG. 10 is a block diagram showing an adjustment device for adjusting control parameters according to a third example of the present invention. Elements which correspond to those in the first example are indicated by the same reference numerals. As a result, further description thereof is omitted. In the present example, inertia of a servo motor combined with a load is estimated. Based on the estimated inertia, a position proportional gain, a velocity proportional gain, and a velocity integral gain are adjusted.

A motor model 21 representing a servo motor combined with a load includes a force constant KT of a servo motor 10 combined with a load 11, a term representing inertia 1/(JM+JL) of the servo motor 10 combined with the load 11, and a term representing inertia elements 1/(S * S). Abbreviations TRQ and ACC respectively represent torque generated by the servo motor 10 and a rotation angular acceleration of the servo motor 10.

A signal U in which a signal $V_g$ from a velocity proportional gain adjuster 4 and a signal I from an integrator 6 are added is input to a voltage-current convertor 22 having a conversion gain VM. The voltage-current convertor 22 outputs a current instruction $I_r$ obtained by multiplying the signal U by the conversion gain VM to the motor model 21 and a multiplier 24. The motor model 21 generates a rotation angle signal $X_a$ in accordance with the current instruction $I_r$. The generated rotation angle signal $X_a$ is input to a differentiator 7 and a double differential or 23. The double differentiator 23 differentiates the rotation angle signal $X_a$ twice so as to derive an estimated angular acceleration ACC#. The estimated angular acceleration ACC# is input to a calculator 26.

The multiplier 24 multiplies the current instruction $I_r$ by a nominal value KT# of the force constant of the servo motor so as to derive estimated generated torque TRQ#. The estimated generated torque is input to an integrator 25. The integrator 25 outputs an integral STRQ# of the torque to the calculator 26 in accordance with the estimated generated torque TRQ# input thereto. The calculator 26 derives estimated inertia JL# of the load based on the integral STRQ# and the estimated angular acceleration ACC#.

Although the estimated inertia JL# of the load 11 was derived based on the rotation angle signal $X_a$ output from a rotary encoder 12, it is also possible to derive the estimated inertia JL# of the load 11 based on a rotational position signal output from the rotary encoder 12.

FIGS. 11A to 11F show a relationship, when such a velocity instruction is given to the servo motor combined with the load that the rotational velocity of the servo motor is increased for a certain period of time at an equal acceleration and then is decreased for another certain period time, and so on, between a rotational velocity instruction (FIG. 11A), acceleration of the servo motor (FIG. 11B), a torque component due to inertia of the servo motor combined with the load (FIG. 11C), a torque component due to viscosity resistance (FIG. 11D), a torque component due to partial weighting (FIG. 11E), and integrals of torque (FIG. 11F), illustrated with respect to time.

With the load being attached to the servo motor, the servo motor is accelerated at a predetermined positive acceleration until reaching a predetermined velocity, and then is decelerated at a predetermined negative acceleration until reaching another predetermined velocity. An integral of a torque TRQ# from the multiplier 24 during the acceleration is defined as an integral value (a1+b1+c1). An integral of a produced of (−1) and the torque TRQ# from the multiplier 24 during the deceleration is defined as an integral value (a2−b2−c2). Then, the integral values (a1+b1+c1) and (a2−b2−c2) are added. Thus, the torque component due to viscosity resistance and the torque component due to partial weighting are removed, whereby the integral value STRQ# as a total of absolute values of the torque due to inertia of the servo motor combined with the load is obtained. Based on the integral value STRQ# thus obtained and the estimated angular acceleration ACC#, an operation represented by Formula XII is conducted so as to derive the estimated inertia JL# of the load.

$$JL\# = \frac{\int TRQ\# dt}{ACC\#} - JM\# \quad \text{(XII)}$$

JM# represents a nominal value of inertia of a rotator of the servo motor.

$$TQ1 = a1 + b1 + c1 \quad \text{(XIII)}$$

$$\begin{aligned} TQ2 &= TQ1 + a2 - b2 - c2 \\ &= a1 + a2 \end{aligned} \quad \text{(XIV)}$$

$$\begin{aligned} TQ3 &= TQ2 + a3 + b3 - c3 \\ &= a1 + a2 + a3 + b3 - c3 \end{aligned} \quad \text{(XV)}$$

$$\begin{aligned} TQ4 &= TQ3 + a4 - b4 + c4 \\ &= a1 + a2 + a3 + a4 \end{aligned} \quad \text{(XVI)}$$

Figure 11A:
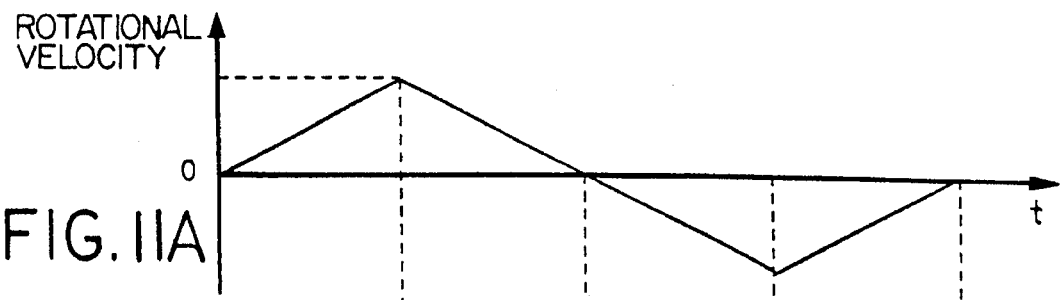
FIGS. 11A to 11F are waveform diagrams showing waveforms of a rotational velocity instruction, acceleration, torque components due to inertia, viscosity resistance, and partial weighting, and an integral of torque, respectively, of a servo motor.
Figure 11B:
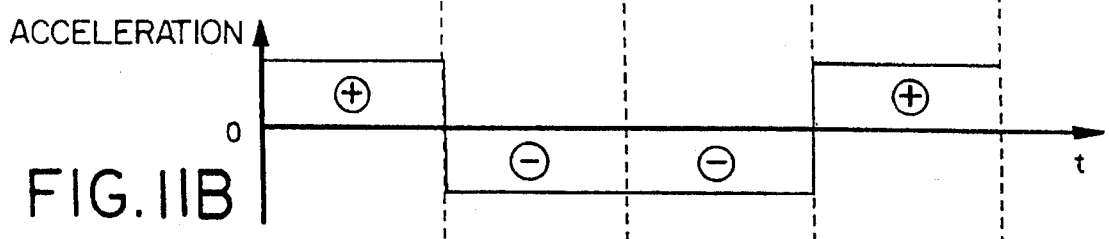
Figure 11C:
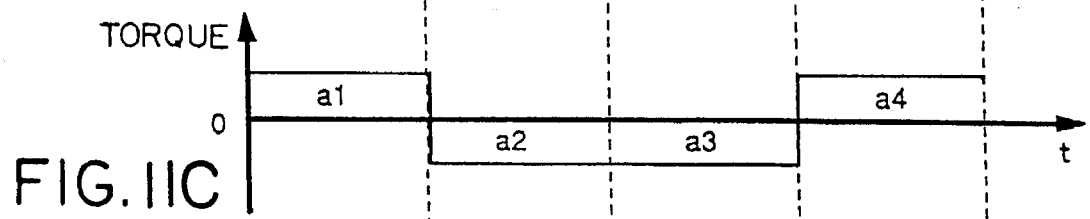
Figure 11D:
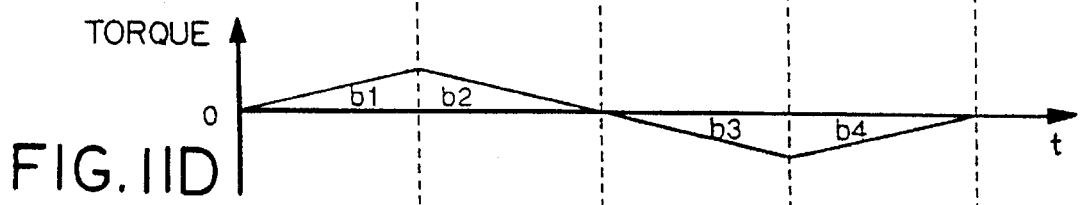
Figure 11E:
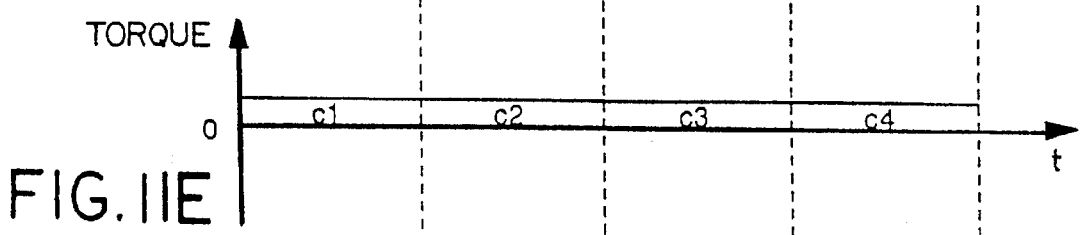
Figure 11F:
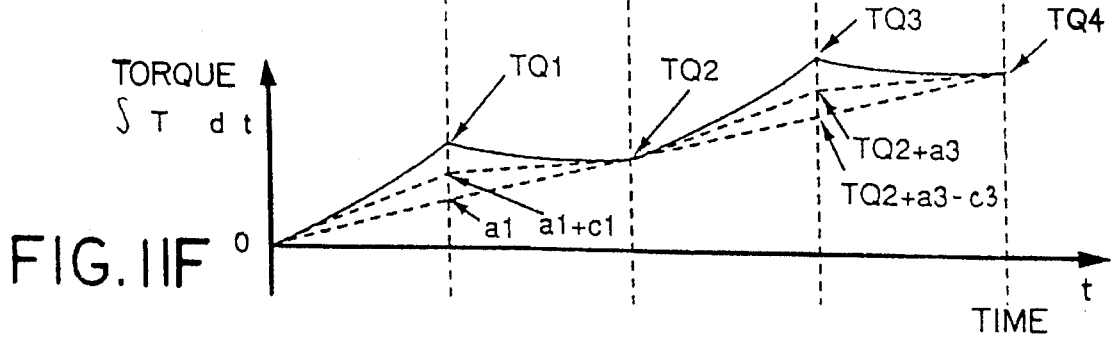

With reference to FIGS. 11C to 11E, areas a1 to a4, b1 to b4, and c1 to c4 satisfy the following Formulae XIII to XV1. Each of the areas a1 to a4 is defined as an area surrounded by the line representing the torque component due to inertia of the servo motor combined with the load; each of the areas b1 to b4 is defined as an area surrounded by the line representing the torque component due to viscosity resistance; and each of the areas c1 to c4 is defined as an area surrounded by the line representing the torque component due to partial Weighting. It is assumed that b1 is equal to b2; c1 is equal to c2; b3 is equal to b4; and c3 is equal to c4.

Figure 12:
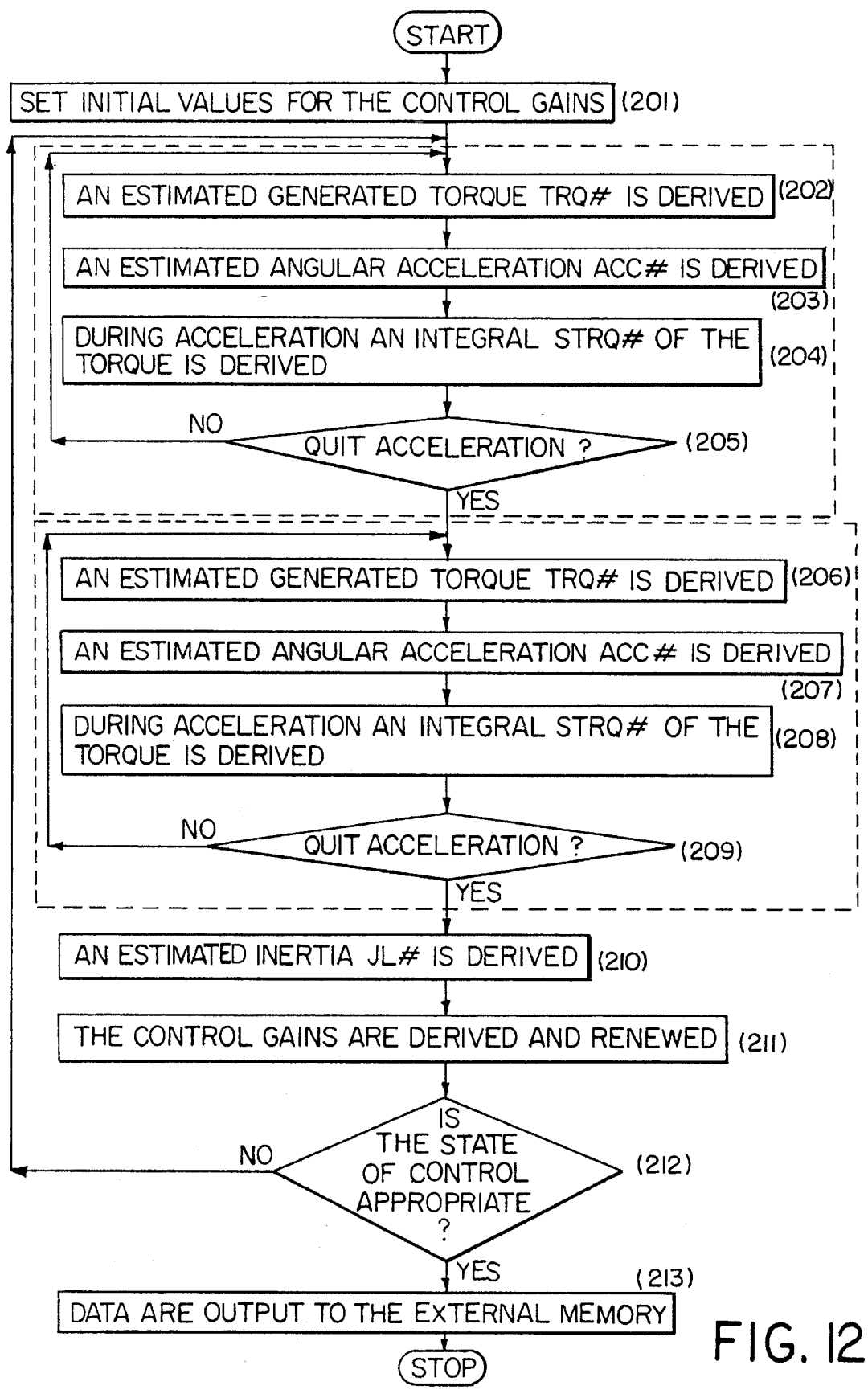
FIG. 12 is a flow diagram showing a flow of control in an operation of an adjustment device for adjusting control parameters according to a third example of the present invention.

FIG. 12 is a flow diagram showing a flow of control in an operation of the adjustment device of the present example.

Initial values of the control gains are set to each of the gain adjusters 3 to 5 by the gain setting section 2 (Step 201) in response to input values provided by the operator via the key inputting section 14. An estimated angular acceleration ACC# and an integral value STRQ# of the torque during an acceleration of the servo motor 10 are derived by controller 29 as described above (Steps 202 to 205).

Next, an estimated angular acceleration ACC# and an integral value STRQ# of the torque during a deceleration of the servo motor are derived by controller 29 as described above (Steps 206 to 209).

The estimated inertia JL# is derived by calculator 26 based on the estimated angular acceleration ACC# and the integral value STRQ# of the torque TRQ# during the acceleration of the servo motor and the estimated angular acceleration ACC# and the integral value STRQ# of the torque TRQ# during the deceleration of the servo motor 10 (Step 210).

The control gains are derived by controllor 29 based on the estimated inertia JL#, and set in gain adjusters 3 to 5 by the gain setting section 2 (Step 211).

A rotation angle signal $X_a$ or an angular velocity signal $V_a$ of the servo motor, for example, is output to a display section such as the display section 15 so as to indicate the state of control of a control system of the servo motor as a result of the setting of the above-mentioned control gains in the gain adjusters 3 to 5. In cases where comparison of these signals with instructions therefor reveals that error amounts or hunching amplitude of these signals are larger than a prescribed amount as determined by the operator based on the display section 15, Steps 202 to 212 are repeated, since it is presumable that the state of control is inappropriate.

If the state of control is judged appropriate by the operator, the estimated inertia JL#, estimated angular acceleration ACC#, integral value STRQ# of the torque TRQ#, and the like are output to an external memory (Step 213). Thus, the adjustment has been completed.

As has been described, according to the present example, inertia of the load is repeatedly estimated based on the estimated angular acceleration ACC# and the integral value STRQ# of the torque TRQ# during an acceleration of the servo motor 10 and the estimated angular acceleration ACC# and the integral value STRQ# of the torque TRQ# during a deceleration of the servo motor 10. Based on the estimated inertia JL# thus obtained, correction for the control gains included in the control system can be conducted simultaneously with the operation of the servo motor 10.

Accordingly, in cases where the load 11 for the servo motor 10 and/or the friction during rotation of the servo motor 10 have slightly varied due to temporal deterioration or change in circumstances, the control gains can be readjusted even during operation of the servo motor 10. Moreover, when the load 11 temporarily becomes excessive so that the stability of a control loop of the servo motor is lowered or the control loop goes out of control, such situations can be automatically detected at once, whereupon the control parameters can be readjusted so that the control loop becomes stable. It is also possible to stop the operation of machinery to which the servo motor 10 is connected as emergency means, for example.

EXAMPLE 4

Figure 13:
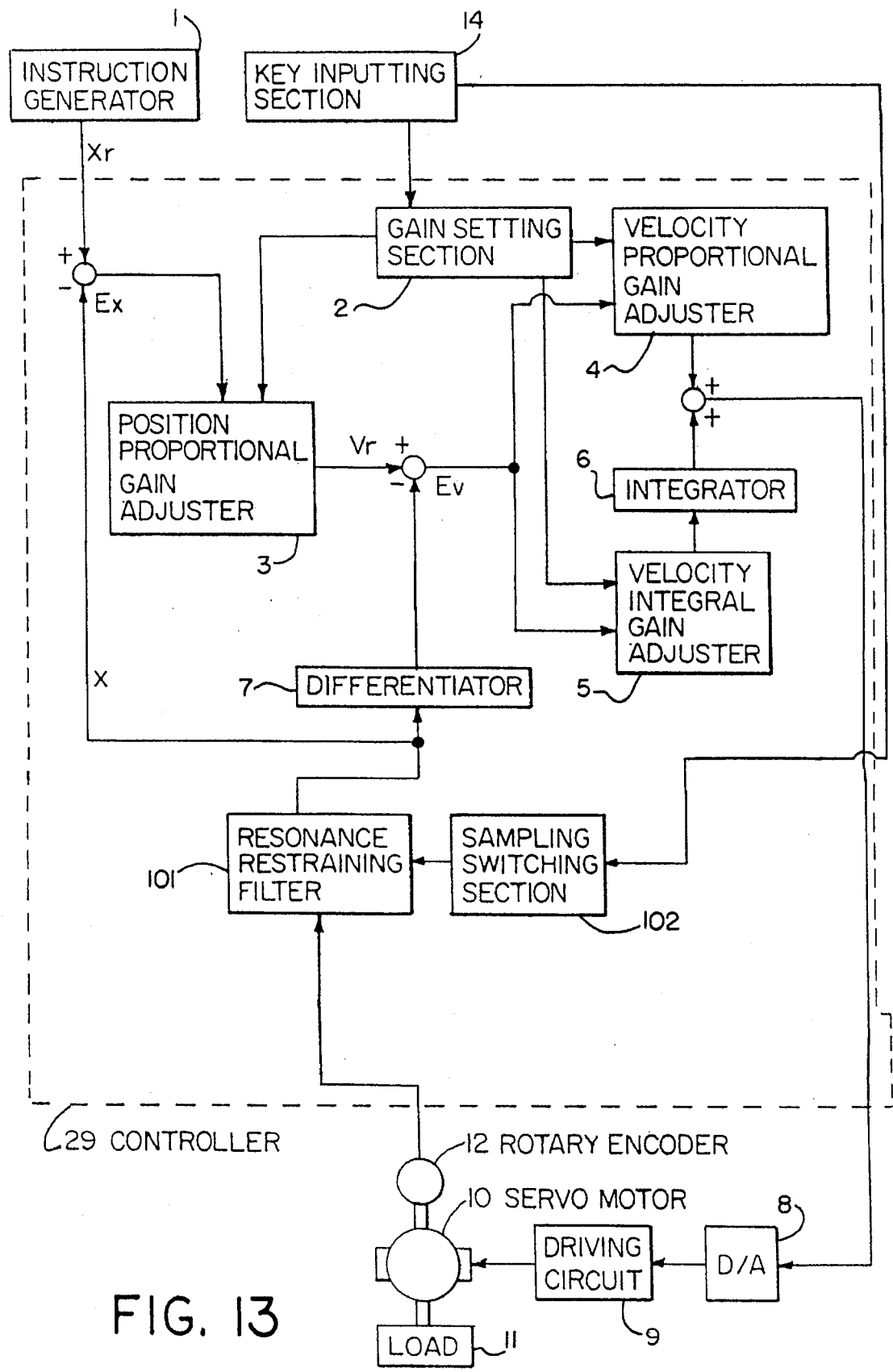
FIG. 13 is a block diagram showing an adjustment device for adjusting control parameters according to a fourth example of the present invention.

FIG. 13 is a block diagram showing an adjustment device for adjusting control parameters according to a fourth example of the present invention. Elements which correspond to those in the first example are indicated by the same reference numerals. Accordingly, descriptions therefor are omitted. As is shown in FIG. 13, the adjustment device further includes a resonance restraining filter 101, and a sampling switching section 102.

The resonance restraining filter 101 includes a digital filter. The digital filter restrains a gain in a desired frequency band in accordance with a frequency signal and a restraining rate signal fed thereto. The frequency signal represents a sampling rate of the digital filter. The restraining rate signal represents a rate by which a signal input to the digital filter is restrained. Until a frequency signal or a restraining rate signal is fed to the resonance restraining filter 101, an initial value for each signal is input in the digital filter. In the present example, the frequency signal is input by means of a key inputting section 14. More specifically, sampling frequencies of 1 kHz, 2 kHz, etc. are input as sampling rates by means of the key inputting section 14. Moreover, the frequency signal is input to the resonance restraining filter 101 by way of the sampling switching section 102.

The resonance restraining filter 101 may be represented by e pulse transfer function shown in Formula XVII:

$$G(z)=0.25 \cdot (1+z^{-1}+z^{-2}+z^{-3})$$ (CVII)

Figure 14A:
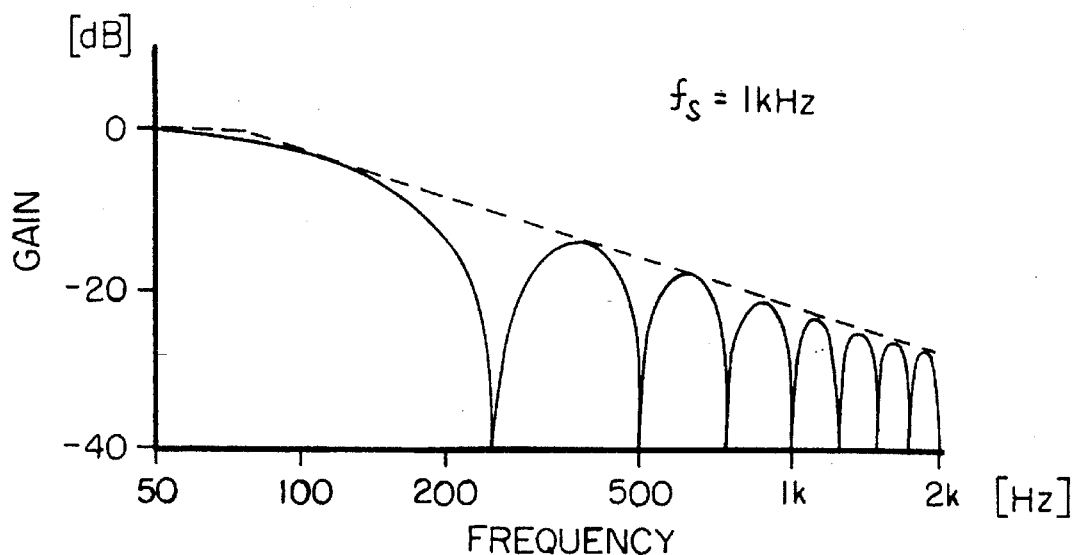
FIGS. 14A and 14B are curves showing frequency characteristics of a pulse transfer function of a resonance restraining filter in a fourth example of the present invention.
Figure 14B:
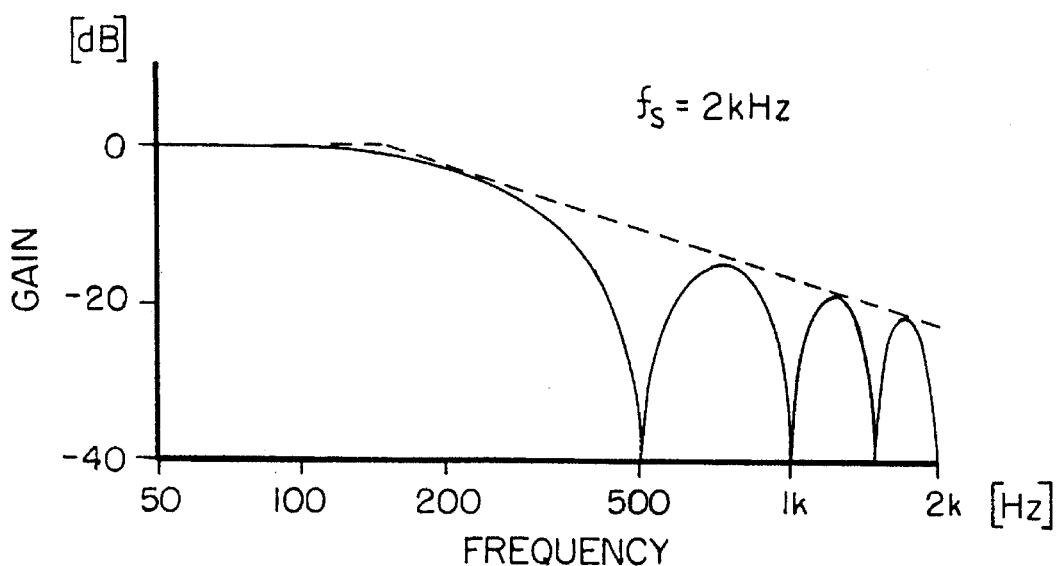

FIG. 14 is a view showing frequency characteristics of the pulse transfer function (shown by Formula XVII) of the resonance restraining filter 101. FIG. 14A describes a case where the sampling frequency $f_s$ is 1 kHz, while FIG. 14B describes a case where the sampling frequency $f_s$ is 2 kHz. Each of FIGS. 14A and 14B describes a case where the resonance restraining filter 101 includes a sample holder corresponding to the sampling frequency $f_s$. The resonance restraining filter 101, when having characteristics shown by the dotted line in FIG. 14A, may be regarded as a low pass filter having a linear characteristics curve bending at 75 Hz.

On the other hand, the characteristics curve shown in FIG. 14A also suggests that the gain steeply drops in the vicinity of frequencies which are multiples of 250 Hz. When having characteristics shown by the dotted line in FIG. 14B, the resonance restraining filter 101 may be regarded as a low pass filter having a linear characteristics curve bending at 150 Hz. However, the characteristics curve shown in FIG. 14B also suggests that the gain steeply drops in the vicinity of frequencies which are multiples of 500 Hz. Each of these two kinds of digital filters can be realized using known techniques as a program consisting of a set of operations as a digital filter having the pulse transfer function represented by Formula XVII, the program being processed by a micro computer (not shown). The digital filters can also be realized as a gate array or the like.

Functions of the resonance restraining filter 101 will be further described. As a first function, the resonance restraining filter 101 serves as a low pass filter for restraining noises in a high frequency band and a resonance component of a servo motor 10. Corresponding to a gain crossover frequency $f_c$ (which reflects response of a control loop of the adjustment device) set by means of the key inputting section 14, the following operation is conducted by the resonance restraining filter 101: When the gain crossover frequency $f_c$ is set at a relatively low value, e.g. 100 Mz, the sampling frequency $f_s$ of the resonance restraining filter 101 is automatically set to be 1 kHz; when the gain crossover frequency $f_c$ is set at 200 Hz, the sampling frequency $f_s$ is automatically set at 2 kHz. Thus, the sampling frequency $f_s$ is selected in accordance with a given gain crossover frequency. Phase characteristics of the servo motor 10 can be improved due to the above-mentioned restraint of resonance.

As a second function, the resonance restraining filter 101 cancels resonance of the servo motor 10, taking advantage of the steep drops of the gain in the vicinity of frequencies that are multiples of 250 Hz or 500 Hz.

The adjustment device according to the present example may further include a section for determining frequency bands in which high-mode mechanical resonance may possibly occur. Such a section can, in conjunction with the above-mentioned resonance restraining filter 101 including a digital filter, restrain the resonance of the servo motor 10 without any other additional means being incorporated. Moreover, since the characteristics of the digital filter can be verged simply by selecting different sampling frequencies therefor, the number of steps in an actual program to be processed by a controller 29 can be reduced. Conversely, it is also possible to provide more resonance restraining filters while preserving the number of the steps in the program.

As has been described, according to the present example, it is made possible to set the control gains at sufficiently high values, since high-mode mechanical resonance of the load of the servo motor 10 is restrained by a resonance restraining filter. Moreover, restraint of resonance of the servo motor is easily realized by selecting the sampling frequency of the digital filter 101 included in the resonance restraining filter in accordance with the state of the mechanical resonance. Furthermore, it is also possible to, when control parameters of The servo motor 10 are adjusted, let the sampling frequency be automatically set in accordance with a given gain crossover frequency. As a result, a conventional problem is solved that The high-mode mechanical resonance of the load of The servo motor 10 may prevent the control gains from being set at high values even in cases where stability of the control system of the servo motor 10 is maintained. In other words, not only that mechanical resonance is restrained, but also adjustment of the control gains is realized using relatively limited hardware and software program for the adjustment device.

EXAMPLE 5

Figure 15:
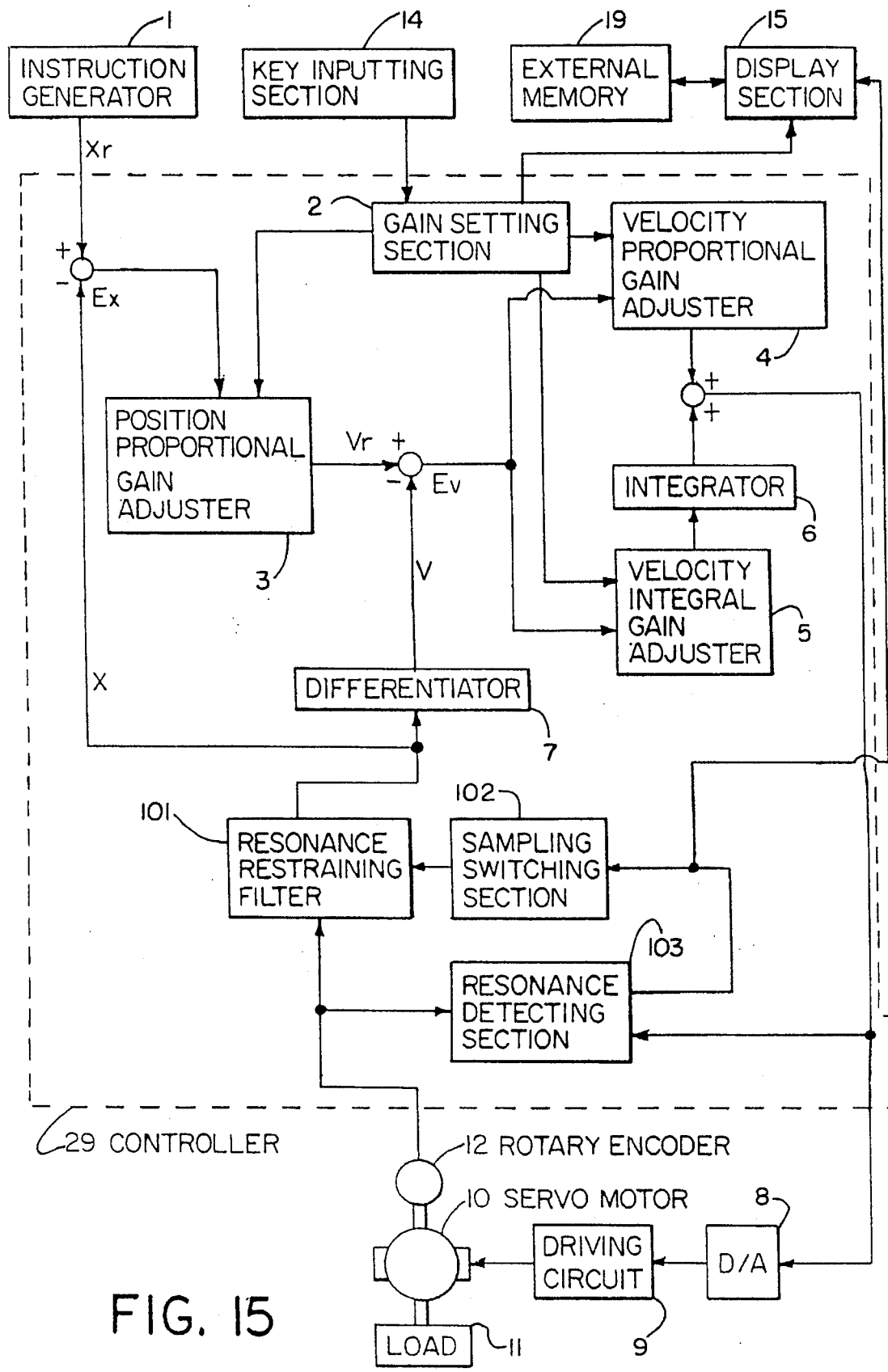
FIG. 15 is a block diagram showing an adjustment device for adjusting control parameters according to a fifth example of the present invention.

FIG. 15 is a block diagram showing an adjustment device for adjusting control parameters according to a fifth example of the present invention. Elements which correspond to those in the first example are indicated by the same reference numerals. Further descriptions thereof are therefore omitted. As is shown in FIG. 15, the adjustment device further includes a resonance restraining filter 101 including the same digital filter as that in the resonance restraining filter 101 of the fourth example, e sampling switching section 102, and a resonance detecting section 103. A gain setting section 2 is connected to an external memory 19 by way of the display section 15 and the key inputting section 14.

Figure 16:
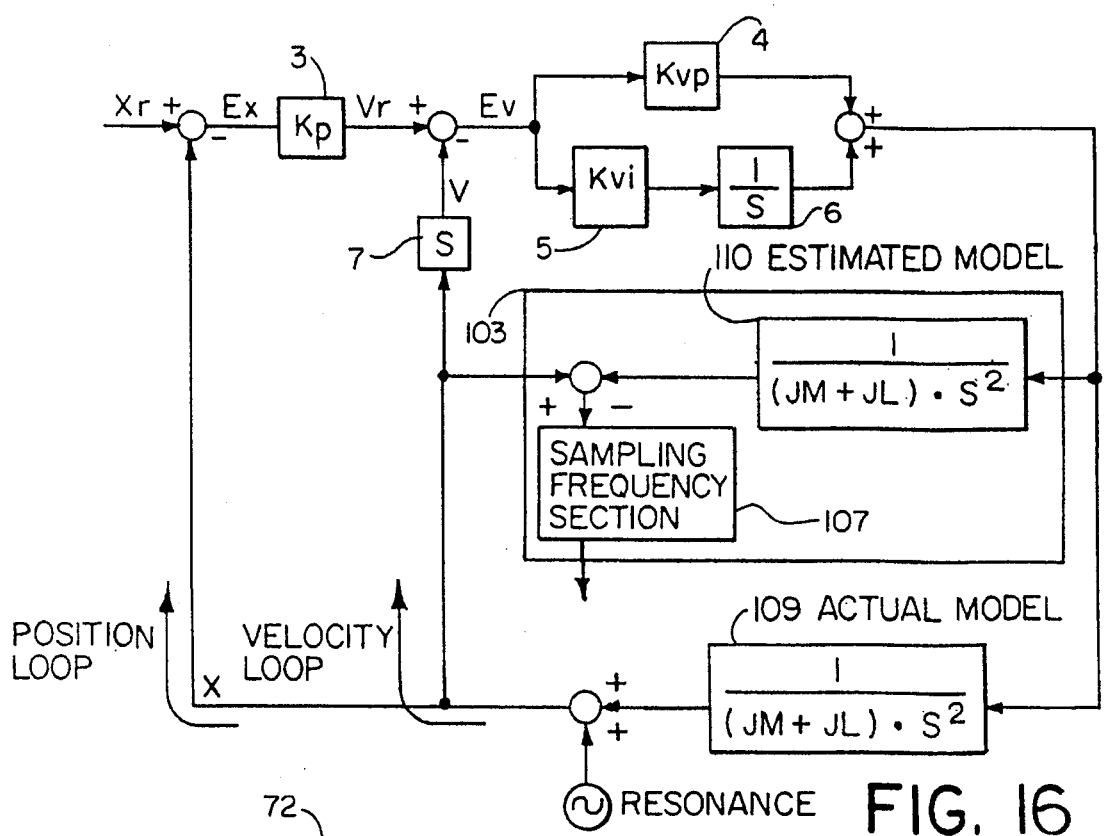
FIG. 16 is a block diagram showing a control system of a servo motor in an adjustment device for adjusting control parameters according to a fifth example of the present invention.

The resonance detecting section 103 will be described in detail. FIG. 16 is a block diagram showing a control system of a servo motor 10 according to the present example. A signal when a high-mode mechanical resonance component appears in the control system of the servo motor 10 is defined as a rotational position signal X, in which an output signal from an actual model 10 of the servo motor 10 when no mechanical resonance is occurring is combined with a mechanical resonance signal occurring due to mechanical resonance of the servo motor 10. An estimated model 110 of the servo motor 10 combined with a load 11 is a mathematical model of the servo motor 10 combined with the load 11. Then, a signal equivalent to the mechanical resonance signal can be obtained by subtracting an output signal from the estimated model 110 from the rotational position signal X. Based on the resultant signal equivalent to the mechanical resonance signal, the sampling Switching section 102 outputs a sampling frequency $f_s$ for restraining resonance to the resonance restraining filter 101. The resonance detecting section 103 may alternatively include a section 107 for generating the sampling frequency $f_s$.

Hereinafter, an operation of the adjustment device of the present example will be described. An exemplary case will be described where the resonance detecting section 103 has detected a resonance while control gains are gradually increased by means of a key inputting section 14 (Step 301). The resonance restraining filter 101 modifies the digital filter thereof so as to operate with a relatively high sampling frequency $f_s$. If the resonance detecting section 103 still detects a resonance, the sampling frequency $f_s$ is lowered than its current value by the sampling switching section 102 which is input the mechanical resonance signal from the resonance detecting section 103. The sampling frequency $f_s$ may be varied by the sampling switching section 102, for example, in a geometrical progression manner, e.g. 2 kHz, 1 kHz, 500 Hz, . . . , etc., or in an arithmetic progression manner, e.g. 2 kHz, 1.5 kHz, 1 kHz, . . . , etc. (Step 302).

The resonance restraining filter 101 further modifies the digital filter thereof so as to operate with another sampling frequency $f_s$. Thereafter, Step 302 is executed by the sampling switching section 102 (Step 303). The sampling frequency $f_s$ is lowered by degrees until the resonance stops with a sufficient phase margin being secured. However, each changing of the sampling frequency $f_s$ can be conducted in a very small amount of time which is long enough for the digital filter to constantly operate.

Next, a case will be described where a high-mode mechanical resonance is generated or increased due to some cause during actual use of the servo motor 10, the control parameters having been adjusted. It is assumed that a loop gain has been optimized and that the digital filter in the resonance restraining filter 101 is so modified as to restrain mechanical resonance detected in an initial adjustment. If a resonance is detected by the resonance detecting section 103, the loop gain is greatly lowered to an extent where no resonance is detected, for the sake of security. Subsequently, the loop gain is gradually increased, wherein the sampling frequency $f_s$ is changed in very small periods of time so that it may be determined at which frequency resonance is detected. Moreover, the resonance restraining filter 101 selects one of a plurality of digital filter programs included therein. Finally, such control gains and sampling frequency are set that no resonance is detected. Thus, the gain adjustment has been completed.

As has been described, according to the present example, it is made possible to set the control gains at sufficiently high values, since high-mode mechanical resonance of the load of the servo motor is restrained by a resonance restraining filter. Moreover, restraint of resonance of the servo motor is easily realized by selecting the sampling frequency of a digital filter included in the resonance restraining filter in accordance with the state of the mechanical resonance. Furthermore, since a resonance detecting circuit is incorporated, it is made possible to let the sampling frequency be automatically set when resonance is detected. As a result, a conventional problem is solved that the high-mode mechanical resonance of the load of the servo motor may prevent the control gains from being set at high values even in cases where stability of the control system of the servo motor is maintained. In other words, not only that mechanical resonance is resonance is restrained, but also resonance can be detected without using a special measurement apparatus during adjustment of control parameters. As a result, adjustment of the control parameters is realized using relatively limited hardware and software resources for the adjustment device, against possible resonances.

EXAMPLE 6

Figure 17:
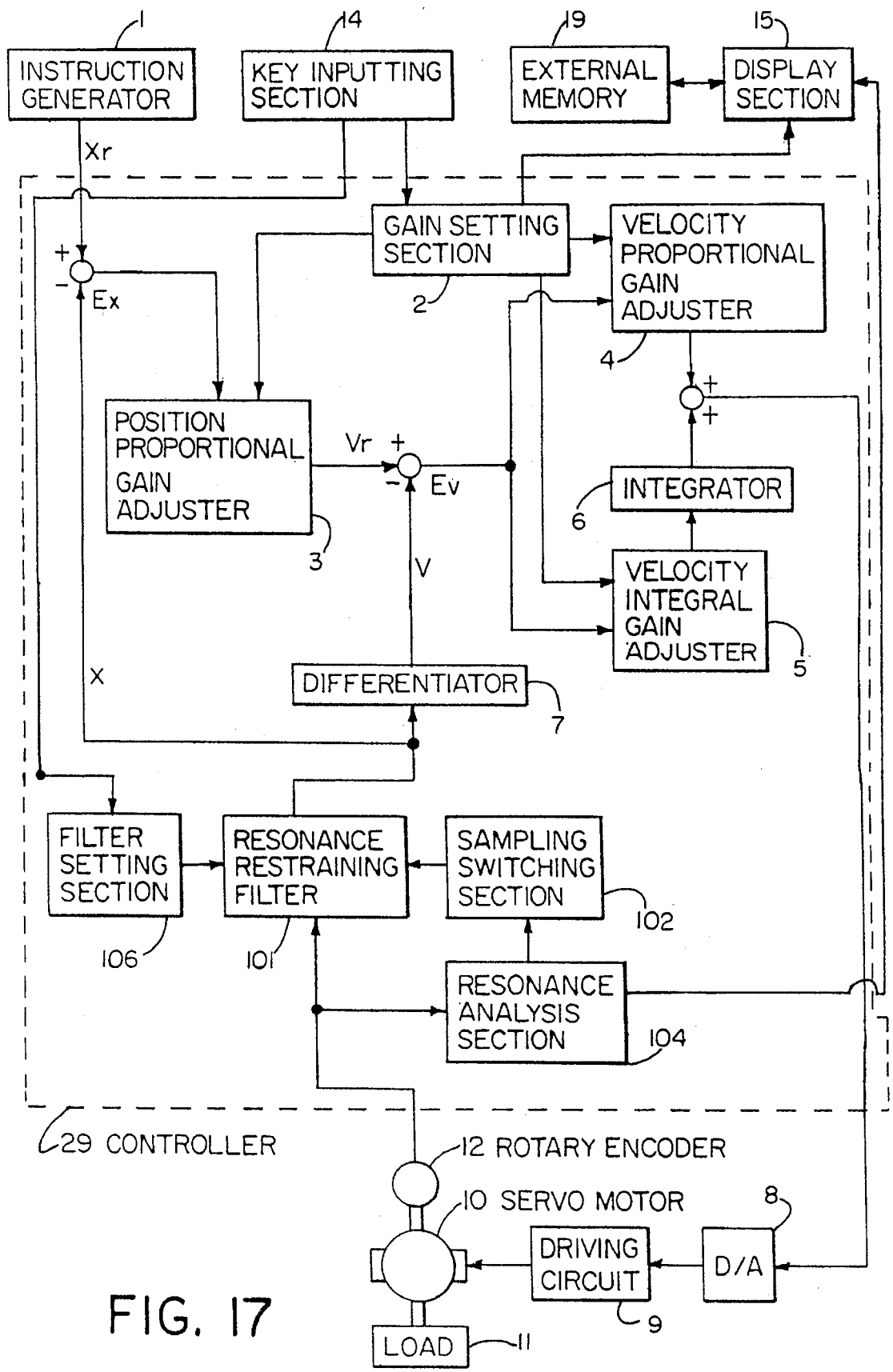
FIG. 17 is a block diagram showing an adjustment device for adjusting control parameters according to a sixth example of the present invention.
Figure 18A:
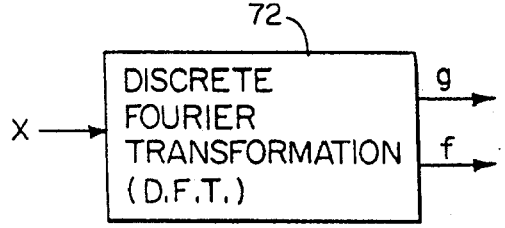
FIG. 18A is a block diagram showing a configuration for a resonance analysis circuit in an adjustment device for adjusting control parameters according to a sixth example of the present invention.
Figure 18B:
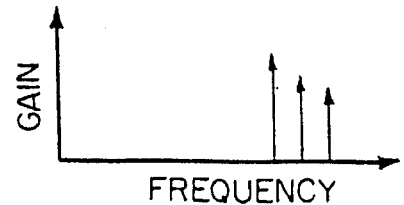
FIG. 18B is a diagram showing frequency characteristics of a resonance obtained by analyzing the resonance with respect to frequency.

FIG. 17 is a block diagram showing an adjustment device for adjusting control parameters according to a sixth example of the present invention. Elements which correspond to those in the first example are indicated by the same reference numerals. As a result, further descriptions thereof are omitted. As is shown in FIG. 17, the adjustment device further includes a resonance restraining filter 101 including the same digital filter as that in the resonance restraining filter of the fourth example, a sampling switching section 102, a resonance analysis section 104, and a filter setting section 106. The resonance analysis section 104 is connected to a display section 15 and sampling switching section 109. A gain setting section 2 is connected to an external memory 19 by way of the display section 15 and the key inputting section 14. The filter setting section 106 inputs a rate, by which a signal input to the digital filter is restrained, to the resonance restraining filter 101. FIG. 18A is a block diagram showing a configuration for the resonance analysis Section 104. As is shown in FIG. 18A, the resonance analysis section 104 includes a Discrete Fourier Transformation section 72. The resonance analysis section 104 analyzes the frequency and the amplitude of the resonance based on a signal generated by a rotary encoder 12, and outputs a corresponding frequency signal f and a corresponding amplitude signal g. FIG. 18B is a diagram showing a characteristic curve obtained by analyzing the signal generated by the rotary encoder 12. Characteristics of the resonance can be seen from FIG. 18B. The display section 15 is capable of displaying the characteristics curve based on the frequency signal f and the amplitude signal g. Data of the frequency (represented by the signal f), the amplitude (represented by the signal g), and the like of the resonance are stored in the external memory 19.

Hereinafter, an operation of the adjustment device of the present example will be described. A case will be described where the resonance analysis section 104 has detected a resonance while control gains are gradually increased by means of the key inputting section 14. The resonance restraining filter 101 includes a plurality of digital filter programs. A table illustrating the relationship between a sampling frequency $f_s$ of each digital filter program and frequencies at which the gain of the digital filter program steeply drops is prepared in advance. A digital filter program having suitable restraining characteristics for a given resonance frequency is automatically selected based on the prepared table. Then, control gains are increased by degrees until the resonance stops with a sufficient phase margin being secured.

Next, a case will be described where a high-mode mechanical resonance is generated or increased due to some cause during actual use of the servo motor 10, the adjustment having been duly conducted. It is assumed that the control gains have been optimized and that the digital filter in the resonance restraining filter 101 is so modified as to restrain mechanical resonance detected in en initial adjustment. If a resonance is detected by the resonance analysis section 104, the control gains are greatly lowered to an extent where no resonance is detected, for the sake of security. Subsequently, a digital filter program corresponding to the resonance frequency is selected, whereupon the control gains are gradually increased until the resonance stops with a sufficient phase margin being secured.

As has been described, according to the present example, it is made possible to set the control gains at sufficiently high values, since high-mode mechanical resonance of the load of the servo motor is restrained by a resonance restraining filter. Moreover, restraint of resonance of the servo motor is easily realized by selecting the sampling frequency of a digital filter included in the resonance restraining filter in accordance with the state of the mechanical resonance. Furthermore, since a resonance analysis circuit is incorporated, it is made possible to let the sampling frequency of the digital filter be automatically set based on an amplitude and a frequency of the mechanical resonance detected by the resonance analysis circuit. As a result, a conventional problem is solved that the high-mode mechanical resonance of the load of the servo motor may prevent the control gains from being set at high values even in cases where stability of the control system of the servo motor 10 is maintained. In other words, not only that mechanical resonance is restrained, but also resonance can be detected without using a special measurement apparatus during adjustment of control parameters. As a result, adjustment of the control parameters is realized using relatively limited hardware and software sources for the adjustment device, against possible resonances.

EXAMPLE 7

Figure 19:
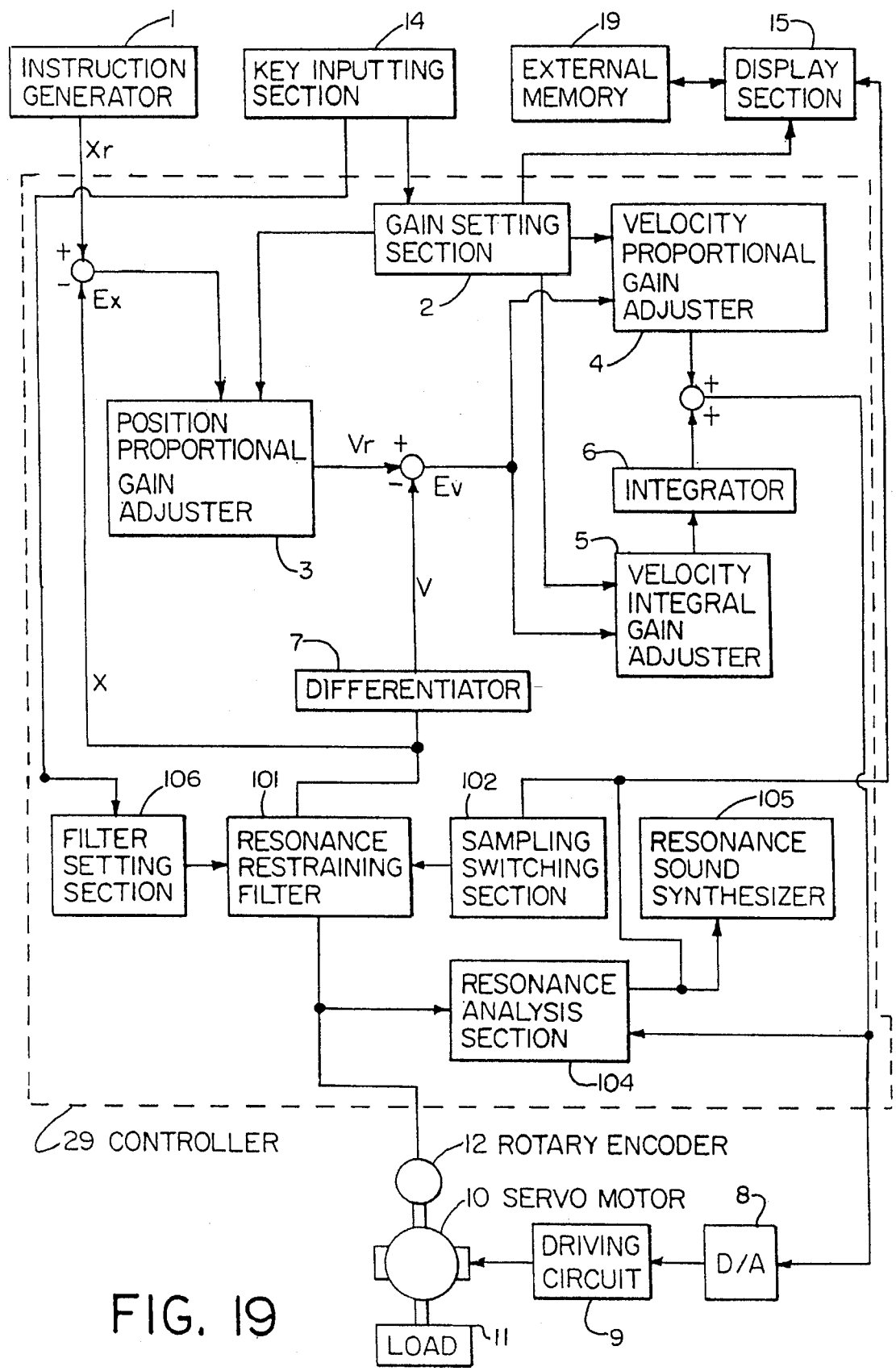
FIG. 19 is a block diagram showing an adjustment device for adjusting control parameters according to a seventh example of the present invention.

FIG. 19 is a block diagram showing an adjustment device for adjusting control parameters according to a seventh example of the present invention. Elements which correspond to those in the first example are indicated by the same reference numerals. Descriptions therefor are omitted. As is shown in FIG. 19, the adjustment device further includes a resonance restraining filter 101 including the same digital filter as that in the resonance restraining filter 101 of the fourth example, a sampling switching section 102, a resonance analysis section 104, a resonance sound synthesizer 105, and a filter setting section 106. The resonance analysis section 104 is connected to a display section 15 and the resonance sound synthesizer 105. A gain setting section 2 is connected to an external memory 19 by way of the display section 15 and the key inputting section 14. The filter setting section 106 inputs a rate, by which a signal input to the digital filter is restrained, to the resonance restraining filter 101. The resonance analysis section 104, including a Fourier transformation section similar to that used in Example 6 (shown in FIG. 18A), analyzes the frequency end the amplitude of a resonance, and outputs a corresponding frequency signal f and a corresponding amplitude signal g. The resonance sound synthesizer 105 synthesizes an audible resonance sound based on an output signal from the resonance analysis section 104.

Figure 20A:
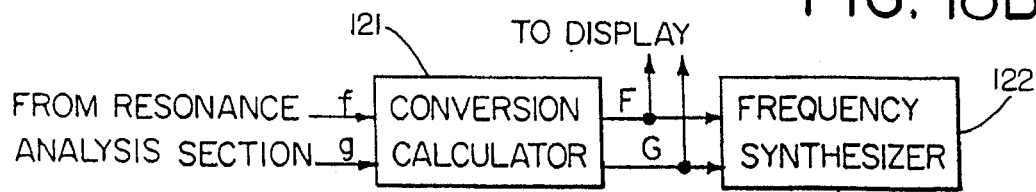
FIG. 20A is a block diagram showing a configuration for a resonance sound synthesizer in an adjustment device for adjusting control parameters according to a seventh example of the present invention.

FIG. 20A is a block diagram showing a configuration of the resonance sound synthesizer 105. As is shown in FIG. 20A, the resonance sound synthesizer 105 includes a conversion calculator 121, a frequency synthesizer 122 and a loudspeaker 123. The conversion calculator 121 converts the frequency signal f input by the resonance analysis section 104 into an audible frequency signal F, and amplifies the amplitude signal g into an audible-level amplitude signal G. The frequency synthesizer 122 synthesizes an output signal from the conversion calculator 121 into an audible sound. The loudspeaker 123 outputs an output signal from the frequency synthesizer as a sound.

Figure 20B:
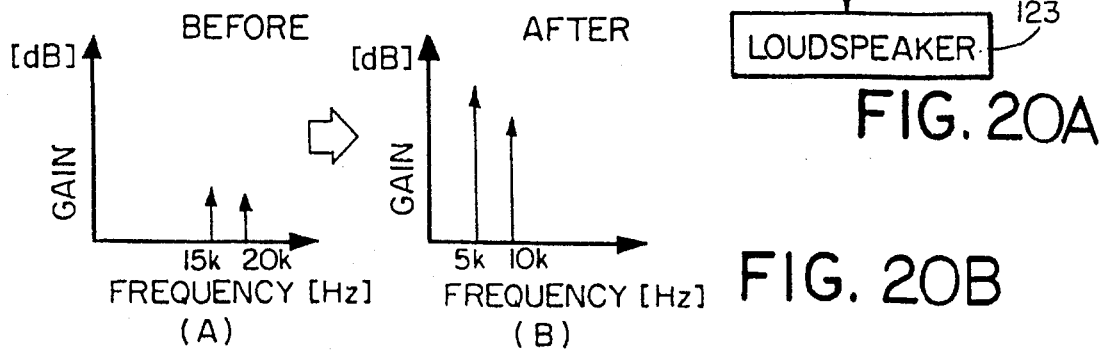
FIG. 20B is a diagram showing change in frequency characteristics due to a frequency conversion according to a seventh example of the present invention.

FIG. 20B is a diagram showing change in frequency characteristics due to a frequency conversion. Graph (A) illustrates a case where resonance is occurring at 15 kHz and 20 kHz. At least one of these frequencies are not within an audible range, and amplitude levels thereof are extremely low. Graph (B) illustrates a result of a conversion by the resonance sound synthesizer 105. As is shown in Graph (B), the frequencies have been converted into 5 kHz and 10 kHz, which are audible frequencies, and the amplitude levels have been increased sufficiently to drive the loudspeaker 123. As a result, an adjustment engineer is informed of the presence of the resonance and of the fact that there are two resonance modes. Moreover, by predetermining the relationship between a tone and a resonance mode of a resonance sound, it becomes possible for an adjustment engineer to, by merely hearing the resonance sound, instantly and inspirationally grasp what is meant by the resonance sound, i.e. the location and cause of the resonance.

Hereinafter, an adjustment method for control parameters of the servo motor 10 according to the present example will be described. First, an operation of the adjustment device during adjustment of control gains will be described. If the resonance analysis section 104 detects a resonance while control gains are gradually increased by means of the key inputting section 14, a resonance sound corresponding to the resonance frequency is synthesized so as to be output from the loudspeaker 123, informing an adjustment engineer of the presence of the resonance. At the same time, a spectrum of the resonance is output to the display section 15. An appropriate digital filter program for the resonance frequency is selected. Then, control Gains are increased by the gain setting section 2 until the resonance stops with a sufficient phase margin being secured. At this, the adjustment engineer is able not only to view the spectrum displayed on the display section 15 but also to hear the resonance, making possible a very fine adjustment.

Next, a case will be described where a highmode mechanical resonance is generated or increased due to some cause during actual use of the servo-motor It is assumed that the control gains have been optimized and that the digital filter of the resonance restraining filter 101 is so modified as to restrain mechanical resonance detected in an initial adjustment. If a resonance is detected by the resonance analysis section 104, the emergency is indicated by a resonance sound, end thereafter the control gains are greatly lowered to an extent where no resonance is detected, for the sake of security. If the resonance analysis section 104 keeps detecting a resonance, a digital filter program corresponding to the resonance frequency is selected. Then, the control gains are gradually increased in a manner similar to that mentioned above. At this, too, the adjustment engineer is able not only to view the spectrum displayed on the display section 15 but also to hear the resonance, making possible a very fine adjustment.

As has been described, according to the present example, it is made possible to set the control gains at sufficiently high values, since high-mode mechanical resonance of the servo motor 10 is restrained by a resonance restraining filter 101. Moreover, restraint of resonance of the servo motor 10 is easily realized by selecting the sampling frequency of a digital filter included in the resonance restraining filter in accordance with the state of the mechanical resonance. Furthermore, since a resonance sound synthesizer converts resonance of a control system of the servo motor into an audible resonance, it is made possible to follow minute changes in the resonance during adjustment, whereby it becomes possible to further optimize the control gains. As a result, a conventional problem is solved that the high-mode mechanical resonance of the load of the servo motor may prevent the control gains from being set at high values even in cases where stability of the control system of the servo motor is maintained. In other words, not only that mechanical resonance is restrained, but also resonance can be detected without using u special measurement apparatus during adjustment of control parameters. As a result, adjustment of the control parameters is realized using relatively limited hardware and software sources for the adjustment device, against possible resonances.

As will be apparent from the above-described examples, the present invention makes possible the following advantages.

(1) When a velocity proportional gain is changed, for example, a velocity integral gain and a position proportional gain are automatically corrected in accordance with the rate of change in the velocity proportional gain so that the amount of phase margin at a gain crossover of a control system does not change. As a result, once initial values of the velocity proportional gain, velocity integral gain, and position proportional gain are set, it becomes possible to adjust all the control parameters by only adjusting the velocity proportional gain, for example, without readjusting the velocity integral gain and position proportional gain.

(2) Change in the rotational velocity, rotational position, torque, and the like of the servo motor can be monitored by watching an image displayed by a display section. Therefore, adjustment of the control parameters can be conducted while constantly grasping the state of control of the servo motor, without using a measurement apparatus such as an oscilloscope.

(3) Moreover, when a control gain is to be changed, the control gain can be gradually changed while the state of control of the servo motor is monitored, since the inputting of the control gain(s) is conducted by means of a key inputting section. As a result, such a mishap is prevented as letting an excess oscillation be generated because of s sudden change in the state of control of the servo motor due to inputting a value which is outside an appropriate range for the control gain.

Moreover, it is so prescribed that each control gain can be increased or decreased by a small amount by pressing an input key of a key inputting section. In addition, the accuracy of adjustment for the control parameters can be varied by means of a magnification rate varying section for switching the rate of increase/decrease corresponding to one pressing of the key inputting section. Therefore, it is made possible to increase the rate of increase/decrease at an initial stage of the adjustment so as to conduct a coarse adjustment, and decrease the rate next so as to conduct a fine adjustment. Thus, it is made easy to input a slightly increased/decreased value for each control gain, as compared with repeating the inputting of all digits of a control gain many times, which would make fine adjustment difficult.

(4) Not only that adjustment of the control parameters can be conducted while constantly grasping the state of control of the servo motor without using a measurement apparatus such as an oscilloscope, but also the adjustment results of the control parameters such as control gains can be kept as data for later use in a readjustment.

(5) Frequency characteristic end phase characteristics of a gain crossover of the control system can be derived by means of the control characteristics analysis, corresponding to one pressing of a key inputting section. The control gains are increased while keeping a balance between one control gain and another, until they attain such a predetermined relationship that the phase margin falls within a predetermined range. Thus, it is made possible to automatically adjust the control gains so that the gain crossover frequency becomes maximum with the phase margin falling within the predetermined range. In other words, the trouble of having to repeat the inputting of all digits of a control gain in order to increase/decrease it is avoided, whereby a fine adjustment is facilitated.

(6) In cases where the load for the servo motor and/or the friction during rotation of the servo motor have slightly varied due to temporal deterioration or change in circumstances, the control gains can be readjusted even during operation of the servo motor. Moreover, when the load temporarily becomes excessive so that the stability of a control loop of the servo motor is lowered or the control loop goes out of control, such situations can be automatically detected at once, whereupon the control parameters can be readjusted so that the control loop becomes stable. It is also possible to stop the operation of machinery to which the servo motor is connected as emergency means, for example.

(7) A conventional problem is solved that the high-mode mechanical resonance of the load of the servo motor may prevent the control gains from being set at high values even in cases where stability of the control system of the servo motor is maintained. In other words, not only that mechanical resonance is restrained, but also resonance can be detected without using a special measurement apparatus during adjustment of control parameters. As e result, adjustment of the control parameters is realized using relatively limited hardware and software sources for the adjustment device, against possible resonances.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An adjustment device for adjusting a plurality of control parameters used for controlling a servo motor, the adjustment device comprising:

first correction means for correcting at least one of the plurality of control parameters;

calculation means for calculating a change rate, due to the correction, of the at least one control parameter corrected by the first correction means; and second correction means for correcting, based on the calculated change rate, the control parameters except the at least one control parameter corrected by the first correction means, the adjustment device including a control system.

2. An adjustment device according to claim 1, wherein the first correction means adjusts the at least one control parameter so that a phase margin of the control system for the servo motor falls within a predetermined range.

3. An adjustment device according to claim 1, wherein the second correction means adjusts the control parameters except the at least one control parameter corrected by the first correction means so that a phase margin of the control system for the servo motor falls within a predetermined range.

4. An adjustment device according to claim 1, wherein the calculation means calculates the change rate based on the at least one control parameter and a corrected value of the at least one control parameter.

5. An adjustment device according to claim 1, wherein the at least one control parameter includes at least one of: a velocity proportional parameter for increasing a response speed of the servo motor; and a velocity integral parameter for reducing e velocity offset of a velocity servo system included in the control system for the servo motor, the velocity servo system approximating a rotational velocity of the servo motor to a predetermined rotational velocity.

6. An adjustment device according to claim 1, wherein the at least one control parameter includes a position proportional parameter for approximating a rotational position of the servo motor to a predetermined rotational position, the control system for the servo motor including a position servo system for approximating the rotational position of the servo motor to the predetermined rotational position.

7. An adjustment device according to claim 1, wherein the at least one control parameter includes at least one of: a velocity proportional parameter for increasing a response speed of the servo motor; a velocity integral parameter for reducing a velocity offset of a velocity servo system for approximating a rotational velocity of the servo motor to a predetermined rotational velocity; and a position proportional parameter for approximating a rotational position of the servo motor to a predetermined rotational position, the control system for the servo motor including the velocity servo system and a position servo system for approximating the rotational position of the servo motor to the predetermined rotational position.

8. An adjustment device according to claim 7, wherein the at least one control parameter is the velocity proportional parameter, and wherein the control parameters except the at least one control parameter corrected by the first correction means are the velocity integral parameter and the position proportional parameter, the second correction means including means for multiplying the velocity integral parameter by the square of the change rate of the velocity proportional parameter and means for multiplying the position proportional parameter by the change rate of the velocity proportional parameter.

9. An adjustment device according to claim 7, the first correction means comprising key inputting means for increasing and decreasing the at least one control parameter by a predetermined magnification rate, and magnification rate varying means for varying the predetermined magnification rate.

10. An adjustment device according to claim 7 further comprising:

instruction generating means for generating a rotation instruction for the servo motor;

detection means for detecting rotation information of the servo motor and for generating a rotation information signal representing the detected rotation information;

error amount calculating means for calculating an error amount between the rotation information signal and the rotation instruction; and display means for displaying at least one of the rotation information signal, the rotation instruction, and the error amount output.

11. An adjustment device according to claim 7 further comprising:

instruction generating means for generating a rotation instruction for the servo motor;

detection means for detecting rotation information of the servo motor and for generating a rotation information signal representing the detected rotation information;

error amount calculating means for calculating an error amount between the rotation information signal and the rotation instruction;

memory means for storing at least one of the rotation information signal, the rotation instruction, and the error amount;

display means for displaying at least one of the rotation information signal, the rotation instruction, and the error amount output from the memory means in time sequence;

external memory means for storing, in time sequence, at least one of the rotation information signal, the rotation instruction, and the error amount output from the memory means; and printer means for printing at least a portion of an image displayed by the display means.

12. An adjustment device according to claim 10, wherein the display means includes:

selection means for selecting at least one of the rotation information signal, the rotation instruction, and the error amount;

first memory means for storing a first signal generated by, based on the selected one of the rotation information signal, the rotation instruction, and the error amount in time sequence, the selection means;

output means for receiving a second signal generated by, based on a predetermined reference amplitude level, the first memory means;

second memory means for storing a third signal generated by the output means in time sequence and for generating a fourth signal;

display scale setting means for setting a display scale at which the third signal is displayed by the display means; and data storage means for storing the predetermined reference amplitude level, a display range of the fourth signal in an amplitude direction, a display range of the fourth signal in a direction of a time axis, and the display scale.

13. An adjustment device according to claim 10 further comprising velocity proportional parameter adjusting means for increasing the response speed of the servo motor;

velocity integral parameter adjusting means for reducing the velocity offset of the velocity servo system;

position proportional parameter adjusting means for approximating the rotational position of the servo motor to the predetermined rotational position; and differentiation means for generating a differential signal by differentiating the rotation information signal detected by the detection means.

14. An adjustment device according to claim 13 further comprising control characteristics analysis means for calculating gain characteristics and phase characteristics based on the position proportional signal and the differential signal, the gain characteristics representing a relationship between gain values and frequencies and the phase characteristics representing a relationship between phases and frequencies.

15. An adjustment device according to claim 13 further comprising: resonance restraining means for restraining gain corresponding to a certain frequency; and sampling frequency switching means for inputting a signal representing the certain frequency to the resonance restraining means.

16. An adjustment device according to claim 15, wherein a signal representing the certain frequency is input to the resonance restraining means by a key inputting means.

17. An adjustment device according to claim 15 further comprising resonance detecting means for generating a signal representing the certain frequency based on the rotation information generated by the detection means and a signal input to the servo motor.

18. An adjustment device according to claim 17, wherein the detection means includes:

mathematical formula model means in which a mathematical formula representing the servo motor, to which a load is applied, is generated, the mathematical formula model means generating, based on the signal input to the servo motor, a model signal in which a resonance signal is removed from the rotation information signal;

error amount detecting means for calculating an error amount between the model signal and the rotation information signal generated by the detection means; and sampling frequency selecting means for generating the signal representing the certain frequency based on the error amount detected by the error amount detecting means, the signal being such that the error amount becomes minimum.

19. An adjustment device according to claim 17 further comprising resonance analysis means for generating a resonance signal of the servo motor based on the rotation information generated by the detection means and resonance sound synthesizing means for generating a resonance sound based on the resonance signal.

20. An adjustment device according to claim 19, wherein the resonance sound synthesizing means includes frequency conversion means for converting a frequency of the resonance signal generated by the resonance analysis means into an audible frequency and amplifying means for amplifying an amplitude of the resonance signal.

21. An adjustment device according to claim 15, wherein the resonance restraining means includes a digital filter, the resonance restraining means modifying the digital filter in accordance with a certain rate by which the gain is restrained and the certain frequency, and wherein the sampling frequency switching means inputs a signal representing the certain frequency to the digital filter.

22. A method for adjusting a plurality of control parameters used for controlling a servo motor, the method comprising:

a first step for correcting at least one of the plurality of control parameters;

a second step for calculating a change rate, due to the correction, of the at least one control parameter corrected in the first step; and a third step for correcting, based on the calculated change rate, the control parameters except the at least one control parameter corrected in the first step.

23. A method according to claim 22, wherein the first step is a step for adjusting the at least one control parameter so that a phase margin of a control system for the servo motor falls within a predetermined range.

24. A method according to claim 22, wherein the third step is a step for adjusting the control parameters except the at least one control parameter corrected in the first step so that a phase margin of the control system for the servo motor falls within a predetermined range.

25. A method according to claim 22, wherein the second step is a step for calculating the change rate based on the at least one control parameter and a corrected value of the at least one control parameter.

26. A method according to claim 22, wherein the at least one control parameter includes at least one of: a velocity proportional parameter for increasing a response speed of the servo motor; and a velocity integral parameter for reducing a velocity offset of a velocity servo system included in the control system for the servo motor, the velocity servo system approximating a rotational velocity of the servo motor to a predetermined rotational velocity.

27. A method according to claim 22, wherein the at least one control parameter includes a position proportional parameter for approximating a rotational position of the servo motor to a predetermined rotational position, the control system for the servo motor including a position servo system for approximating the rotational position of the servo motor to the predetermined rotational position.

28. A method according to claim 22, wherein the at least one control parameter includes at least one of: a velocity proportional parameter for increasing a response speed of the servo motor; a velocity integral parameter for reducing a velocity offset of a velocity servo system for approximating a rotational velocity of the servo motor to a predetermined rotational velocity; a rotational position of the servo motor to a predetermined rotational position, the control system for the servo motor including the velocity servo system and a position servo system for approximating the rotational position of the servo motor to the predetermined rotational position.

29. A method according to claim 28, wherein the at least one control parameter is the velocity proportional parameter, and wherein the control parameters except the at least one control parameter corrected by the first correction means are the velocity integral parameter and/or the position proportional parameter, the third step including a step for multiplying the velocity integral parameter by the square of the change rate of the velocity proportional parameter and a step for multiplying the position proportional parameter by the change rate of the velocity proportional parameter.

30. A method according to claim 22 further comprising a step for inferring inertia of the servo motor to which a load is applied, based on a rotation instruction signal for commanding acceleration and deceleration of the servo motor and torque of the servo motor when receiving the rotation instruction signal.

31. A method according to claim 25, wherein the first step includes a step for correcting by renewing the velocity proportional parameter, and wherein the second step includes a step for calculating the change rate of the velocity proportional parameter, and wherein the third step including a step for multiplying the velocity integral parameter by the square of the change rate of the velocity proportional parameter and a step for multiplying the position proportional parameter by the change rate of the velocity proportional parameter, the method further comprising:

a fourth step for inferring inertia of the servo motor to which a load is applied;

a fifth step for setting an initial value for each of the velocity proportional parameter, the velocity integral parameter, and the position proportional parameter;

a sixth step for designating a rate at which the velocity proportional parameter is alterable to be the same as or more than a first value;

a seventh step for supplying the servo motor or with an instruction for increasing a rotational velocity of the servo motor to, at a constant acceleration, a predetermined rotational velocity and for decreasing the rotational velocity of the servo motor, at a constant deceleration, from the predetermined rotational velocity to another predetermined rotational velocity;

an eighth step for varying the velocity proportional parameter at a predetermined rate;

a ninth step for executing the first through third steps;

a tenth step for executing an eleventh step under a condition that an error amount between an instructed rotational velocity end an actual rotational velocity of the servo motor is the same as or less than a first amount and that a signal from the servo motor has oscillation of a second amount or less, and for executing the seventh through ninth steps;

the eleventh step for designating the rate at which the velocity proportional parameter is alterable to be less than the first value, under a condition that the error amount is a third amount and that the signal from the servo motor has oscillation of a fourth amount, the third amount being the same or smaller than the first amount, and the fourth amount being the same or smaller than the second amount;

a twelfth step for: executing the seventh through ninth steps and the eleventh steps; and executing a thirteenth step under a condition that the error amount is smaller then the third step and that the signal from the servo motor has oscillation of less than the fourth amount;

the thirteenth step for displaying the plurality of control parameters, a signal generated by the servo motor, and a signal for instructing the servo motor to rotate, by the use of display means;

a fourteenth step for storing the plurality of control parameters, the signal generated by the servo motor, and the signal for instructing the servo motor to rotate in external memory means; and a fifteenth step for printing at least a portion of an image displayed by the display means, by the use of printer means.

32. A method according to claim 31 further comprising, a sixteenth step for deriving an inferred angular acceleration and an integral of torque when the servo motor accelerates;

a seventeenth step for deriving an inferred angular acceleration and an integral of torque when the servo motor decelerates;

an eighteenth step for: repeating the sixteenth and seventeenth steps under a condition that, when a rotational position signal and a velocity signal from the servo motor are compared with, respectively, a rotational position instruction and a rotational velocity instruction, at least one of an error amount and a bunching amplitude is larger than e predetermined value therefor and repeating the fourth step under a condition that each of the error amount and the hunching amplitude is smaller then the predetermined value therefor; and a nineteenth step for storing the inferred inertia, the inferred angular acceleration, and the integral of torque of the servo motor in the external memory means.

33. An adjustment device for adjusting a plurality of control parameters for controlling a servo motor, the adjustment device comprising:

a control system;

first correction means for correcting at least one of the plurality of control parameters;

calculation means for calculating a change rate, due to the correction, of the at least one control parameter corrected by the first correction means; and second correction means for correcting the control parameters, except the at least one control parameter corrected by the first correction means, by adjusting the control parameters in proportion to a function of the change rate.

34. A method for adjusting a plurality of control parameters used for controlling a servo motor, the method comprising:

a first step for correcting at least one of the plurality of control parameters;

a second step for calculating a change rate, due to the correction, of the at least one control parameter corrected in the first step; and a third step of correcting the control parameters, except the at least one control parameter corrected in the first step, by adjusting the control parameters in proportion to a function of the change rate.

* * * * *

UNITED STATES PATENT AND TRADEMARK OFFICE
CERTIFICATE OF CORRECTION

PATENT NO. : 5,475,291
DATED : December 12, 1995
INVENTOR(S) : Shuichi Yoshida, Yukihiro Dojo, Shigeru Matsukawa It is certified that error appears in the above-indentified patent and that said Letters Patent is hereby corrected as shown below:

IN THE CLAIMS:

Column 38, line 54: immediately after "velocity," insert --and a position proportional parameter for approximating--.

Column 39, line 27: delete "or".

Column 39, line 39: change "end" to --and--.

Column 40, line 22: change "bunching" to --hunching--.

Column 40, line 23: change "e" to --a--.

Signed and Sealed this

Twenty-third Day of July, 1996

Attest:

BRUCE LEHMAN

Attesting Officer     Commissioner of Patents and Trademarks